(12) United States Patent
Surthi et al.

(10) Patent No.: US 12,543,308 B2
(45) Date of Patent: Feb. 3, 2026

(54) ELECTRONIC STRUCTURES COMPRISING MULTIPLE, ADJOINING HIGH-K DIELECTRIC MATERIALS AND RELATED ELECTRONIC DEVICES, SYSTEMS, AND METHODS

(71) Applicant: Micron Technology, Inc., Boise, ID (US)

(72) Inventors: Shyam Surthi, Boise, ID (US); Chris M. Carlson, Nampa, ID (US); Richard J. Hill, Boise, ID (US); Davide Resnati, Cinsello Balsamo (IT)

(73) Assignee: Micron Technology, Inc., Boise, ID (US)

( * ) Notice: Subject to any disclaimer, the term of this patent is extended or adjusted under 35 U.S.C. 154(b) by 174 days.

(21) Appl. No.: 16/862,150

(22) Filed: Apr. 29, 2020

(65) Prior Publication Data

US 2021/0343736 A1 Nov. 4, 2021

(51) Int. Cl.
*H01L 27/11582* (2017.01)
*G11C 5/02* (2006.01)
(Continued)

(52) U.S. Cl.
CPC ............ *H10B 41/27* (2023.02); *G11C 5/025* (2013.01); *H10B 43/27* (2023.02); *H10D 88/00* (2025.01)

(58) Field of Classification Search
CPC ........... H01L 27/11524; H01L 27/1157; H01L 27/11578; H01L 27/11582; H01L 29/7808;
(Continued)

(56) References Cited

U.S. PATENT DOCUMENTS

| 8,349,681 B2 * | 1/2013 | Alsmeier ......... H01L 29/66825 257/E21.309 |
| 8,658,499 B2 * | 2/2014 | Makala ............ H01L 29/40117 257/334 |

(Continued)

FOREIGN PATENT DOCUMENTS

| CN | 113097293 A | * | 7/2021 | ......... G11C 16/0466 |
| CN | 116669427 A | * | 8/2023 | ......... G11C 16/0483 |

(Continued)

OTHER PUBLICATIONS

International Search Report for Application No. PCT/US2021/070404, mailed Aug. 6, 2021, 4 pages.
(Continued)

*Primary Examiner* — Ajay Ojha
*Assistant Examiner* — Tsz K Chiu
(74) *Attorney, Agent, or Firm* — TraskBritt

(57) ABSTRACT

An electronic structure comprising stacks comprising alternating dielectric materials and conductive materials in a cell region of the electronic structure. A pillar high-k dielectric material is adjacent to the stacks and in a pillar region of the electronic structure. A charge blocking material, a nitride material, a tunnel dielectric material, and a channel material are adjacent to the pillar high-k dielectric material in the pillar region of the electronic structure. A cell high-k dielectric material surrounds the conductive materials in the cell region of the electronic structure. The cell high-k dielectric material adjoins a portion of the pillar high-k dielectric material. Additional electronic structures are disclosed, as are related electronic devices, systems, and methods of forming an electronic device.

19 Claims, 14 Drawing Sheets

(51) Int. Cl.
  *G11C 5/06* (2006.01)
  *H01L 27/11519* (2017.01)
  *H10B 41/27* (2023.01)
  *H10B 43/27* (2023.01)
  *H10D 88/00* (2025.01)

(58) Field of Classification Search
  CPC ........... H01L 27/11273; H01L 29/7802; H01L 29/66712; H01L 27/11517; H01L 29/788; H01L 29/42324; H01L 29/66825; H01L 29/792; H01L 2924/13081; H01L 2924/13085; H01L 29/6684; H01L 29/78391; H01L 23/5226; H01L 23/5283; H01L 21/76816; H01L 21/76865; H01L 21/76877; H01L 21/76831; H10B 43/27; H10B 43/23; H10B 43/20; H10B 41/35; H10B 41/41; H10B 41/27; H10B 43/35; H10B 43/40; H10B 43/10; H10B 43/50; H10D 30/693; H10D 64/037
  See application file for complete search history.

(56) References Cited

U.S. PATENT DOCUMENTS

| | | | | |
|---|---|---|---|---|
| 9,634,024 | B2* | 4/2017 | Kanamori | H01L 27/1157 |
| 9,831,118 | B1* | 11/2017 | Pang | H01L 23/5329 |
| 9,960,180 | B1* | 5/2018 | Zhou | H01L 27/11582 |
| 10,164,009 | B1 | 12/2018 | Carlson | |
| 10,388,667 | B2 | 8/2019 | Carlson et al. | |
| 10,446,572 | B2 | 10/2019 | Carlson | |
| 10,453,855 | B2 | 10/2019 | Carlson et al. | |
| 10,566,346 | B2* | 2/2020 | Lee | H01L 27/11568 |
| 11,282,850 | B2* | 3/2022 | Takashima | H10B 43/27 |
| 11,672,118 | B2* | 6/2023 | Surthi | H10B 43/27 257/314 |
| 2005/0260814 | A1* | 11/2005 | Cho | H10D 64/035 438/257 |
| 2012/0012920 | A1* | 1/2012 | Shin | H01L 29/7926 257/E29.262 |
| 2012/0091521 | A1* | 4/2012 | Goda | H01L 29/66666 257/E29.17 |
| 2012/0256247 | A1* | 10/2012 | Alsmeier | H01L 29/7889 257/E21.422 |
| 2012/0267701 | A1* | 10/2012 | Chae | H10B 43/35 257/324 |
| 2013/0270625 | A1* | 10/2013 | Jang | H01L 29/7926 257/324 |
| 2013/0270643 | A1* | 10/2013 | Lee | H01L 27/1052 257/365 |
| 2014/0367762 | A1* | 12/2014 | Tian | H10B 43/35 438/264 |
| 2015/0060993 | A1* | 3/2015 | Lee | H10B 43/35 257/324 |
| 2015/0294980 | A1* | 10/2015 | Lee | H10B 43/27 438/591 |
| 2016/0172370 | A1 | 6/2016 | Makala et al. | |
| 2016/0181273 | A1* | 6/2016 | Kim | H10B 43/27 438/269 |
| 2016/0300848 | A1 | 10/2016 | Pachamuthu et al. | |
| 2017/0098659 | A1* | 4/2017 | Yoshimizu | H01L 21/0217 |
| 2017/0278851 | A1* | 9/2017 | Fujii | H01L 29/40117 |
| 2017/0278859 | A1* | 9/2017 | Sharangpani | H01L 21/0217 |
| 2017/0309635 | A1* | 10/2017 | Kim | H10B 43/27 |
| 2017/0373086 | A1* | 12/2017 | Pang | H01L 29/7926 |
| 2018/0277555 | A1 | 9/2018 | Fukushima et al. | |
| 2018/0294272 | A1 | 10/2018 | Fan et al. | |
| 2018/0337195 | A1* | 11/2018 | Jayanti | H01L 29/7883 |
| 2019/0051656 | A1* | 2/2019 | Carlson | H01L 29/4234 |
| 2019/0198520 | A1 | 6/2019 | Kim et al. | |
| 2019/0244969 | A1* | 8/2019 | Lee | H10B 43/10 |
| 2019/0333923 | A1* | 10/2019 | Kim | H01L 27/11573 |
| 2020/0388627 | A1* | 12/2020 | Hopkins | H10B 41/35 |
| 2021/0057434 | A1* | 2/2021 | Surthi | H10D 64/685 |
| 2021/0057435 | A1* | 2/2021 | Surthi | H01L 21/76883 |
| 2021/0057436 | A1* | 2/2021 | Kim | G11C 16/08 |

FOREIGN PATENT DOCUMENTS

KR 10-2013-0116607 A 10/2013
KR 10-2019-0104430 A 9/2019

OTHER PUBLICATIONS

Written Opinion of the International Searching Authority for Application No. PCT/US2021/070404, mailed Aug. 6, 2021, 7 pages.
Taiwanese Search Report and Office Action from Taiwanese Application No. 110113606, dated May 12, 2022, 16 pages with English translation.
Korean Notice of Reasons for Rejection for Korean Application No. 10-2022-7040867, dated Feb. 28, 2024, 6 pages with English translation.
Korean Second Notice of Reasons for Rejection for Korean Application No. 10-2022-7040867, dated Oct. 30, 2024, 17 pages with English translation.
Korean Decision of Rejection for Korean Application No. 10-2022-7040867, dated Aug. 19, 2025, 8 pages with English translation.

* cited by examiner

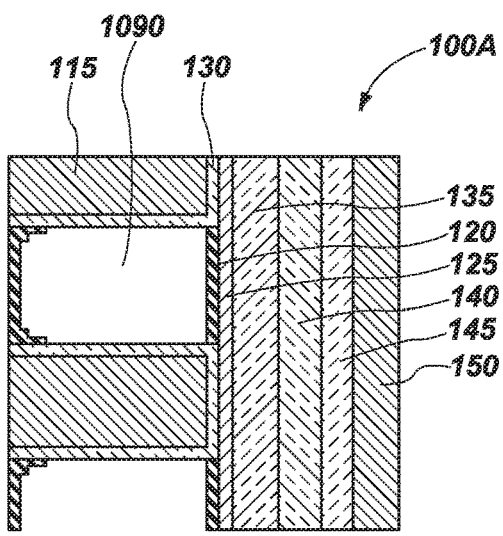
FIG. 5A1
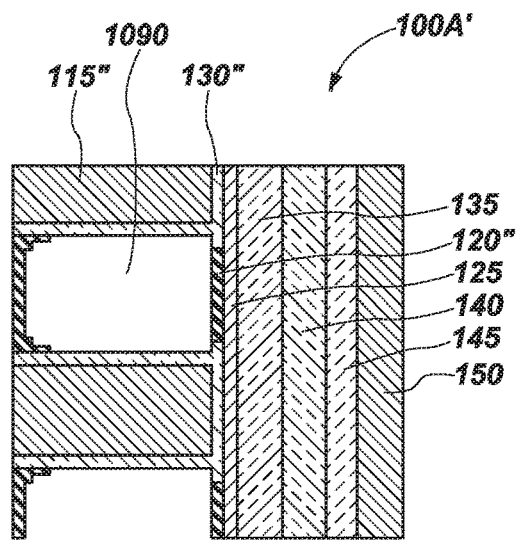
FIG. 5B1
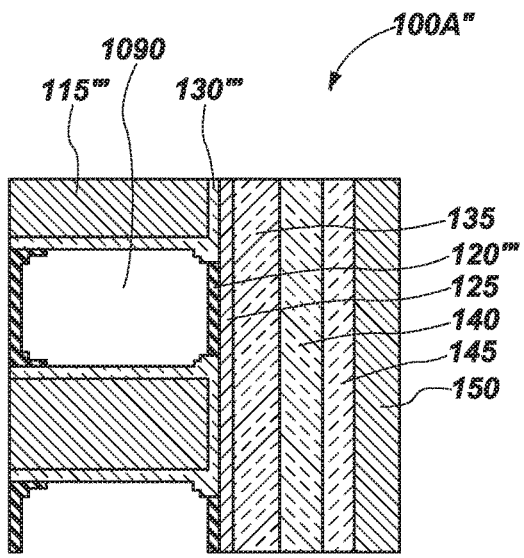
FIG. 5C1

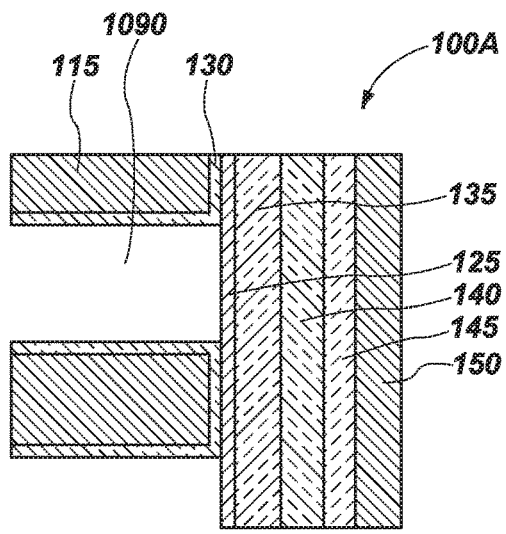
FIG. 5A2
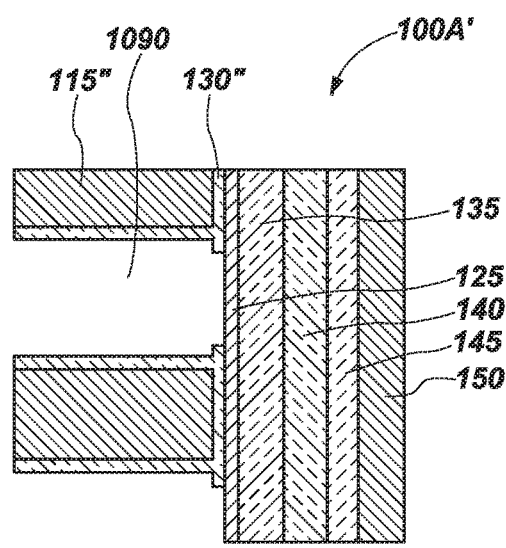
FIG. 5B2
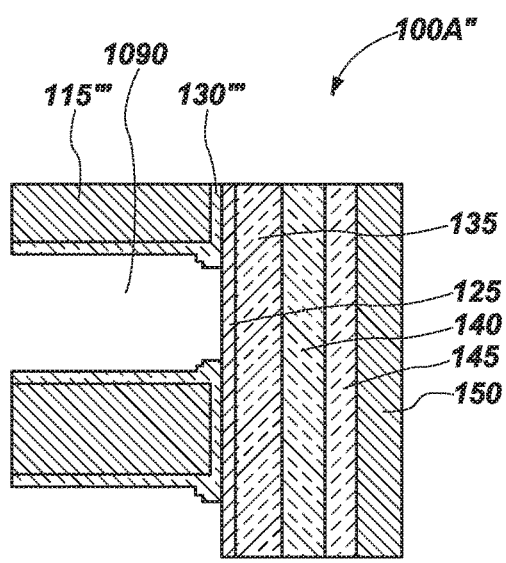
FIG. 5C2

{{ ## US 12,543,308 B2 ## }}

ELECTRONIC STRUCTURES COMPRISING MULTIPLE, ADJOINING HIGH-K DIELECTRIC MATERIALS AND RELATED ELECTRONIC DEVICES, SYSTEMS, AND METHODS

TECHNICAL FIELD

Embodiments disclosed herein relate to electronic structures and devices and electronic device fabrication. More particularly, embodiments of the disclosure relate to electronic structures comprising multiple, adjoining high-k dielectric materials and to related electronic devices including the electronic structures, methods and systems.

BACKGROUND

Electronic device (e.g., semiconductor device, memory device) designers often desire to increase the level of integration or density of features (e.g., components) within an electronic device by reducing the dimensions of the individual features and by reducing the separation distance between neighboring features. Electronic device designers also desire to design architectures that are not only compact, but offer performance advantages, as well as simplified designs. Reducing the dimensions and spacing of features has placed increasing demands on the methods used to form the electronic devices. One solution has been to form three-dimensional (3D) electronic devices, such as 3D NAND devices, in which memory cells are stacked vertically on a substrate. However, as the memory cells are formed closer together and at smaller dimensions, wordline-wordline resistance (RC) (a product of resistance and capacitance) increases. In addition, wordline-wordline coupling increases and program erase and data retention issues arise.

BRIEF DESCRIPTION OF THE DRAWINGS

FIGS. 5A1-5F are cross-sectional views of electronic structures including multiple high-k dielectric materials and one or more of air gaps and a storage node according to embodiments of the disclosure;

DETAILED DESCRIPTION

Figure 1A:
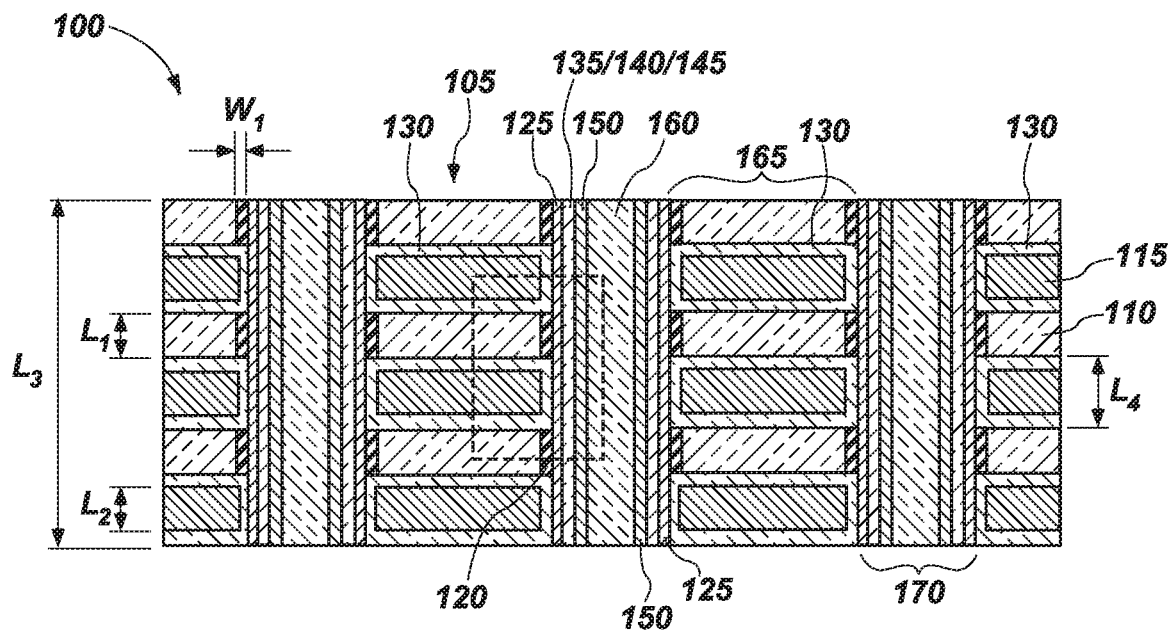
FIGS. 1A and 1B are cross-sectional views of electronic structures including multiple high-k dielectric materials according to embodiments of the disclosure.

An electronic device (e.g., an apparatus, a semiconductor device, a memory device) that includes multiple adjoining high-k dielectric materials is disclosed. Multiple high-k dielectric materials are present in an electronic structure of the electronic device, with at least one high-k dielectric material (e.g., a pillar high-k dielectric material) in a pillar region of the electronic structure and at least one high-k dielectric material (e.g., a cell high-k dielectric material) in a cell region of the electronic structure. The multiple (e.g., two or more) high-k dielectric materials adjoin one another and are substantially coextensive along a length of the cell high-k dielectric material. The multiple high-k dielectric materials are present in the pillar region and in the cell region to isolate (e.g., electrically isolate) a conductive material in the electronic structure of the electronic device. By including a portion (e.g., the pillar high-k dielectric material) of the high-k dielectric materials in the pillar region, additional space is available in the cell region for the conductive material. The conductive material in the cell region may be configured, for example, as a wordline (e.g., a gate) of the electronic device. The conductive material is isolated (e.g., electrically isolated) from other conductive materials in the electronic device by the cell high-k dielectric material and the pillar high-k dielectric material.

The cell region includes a smaller amount (e.g., volume) of a high-k dielectric material than would be present in a conventional electronic device in which the high-k dielectric material is only present in the cell region. A total amount (e.g., total volume) of the high-k dielectric materials in the electronic structure according to embodiments of the disclosure includes a total (e.g., a combined) volume of the pillar high-k dielectric material and the cell high-k dielectric material. The combined volume of the high-k dielectric materials in the electronic structure according to embodiments of the disclosure may be substantially the same as or greater than the volume of high-k dielectric material in a conventional electronic device in which the high-k dielectric material is only present in the cell region. Since the electronic structure includes the high-k dielectric materials in the cell region and in the pillar region and since the combined volume of the high-k dielectric materials is at least maintained, the additional space in the cell region for the conductive material is achieved without negatively affecting electrical performance properties, such as wordline-wordline resistance, wordline-wordline coupling, erase performance, data retention, etc., of the electronic device containing the electronic structure.

The pillar high-k dielectric material and the cell high-k dielectric material adjoin (e.g., are directly adjacent to) one another proximal to the conductive material of the cell region. For instance, the pillar high-k dielectric material and the cell high-k dielectric material are laterally adjacent to (e.g., directly laterally adjacent to) one another proximal to the conductive material. A length of the cell high-k dielectric material is substantially coextensive with a length of the pillar high-k dielectric material, while the length of the pillar high-k dielectric material is greater than the length of the cell high-k dielectric material. An entire length of the cell high-k dielectric material proximal to the conductive material is in direct contact with the pillar high-k dielectric material. The conductive material extends between neighboring pillar regions, and the cell high-k dielectric material extends between the neighboring pillar regions and surrounds the conductive material. An outer surface of the cell high-k dielectric material is in direct contact with the pillar high-k dielectric material and with a dielectric material vertically adjacent to the conductive material, and an inner surface of the cell high-k dielectric material is in direct contact with the conductive material.

Including the high-k dielectric materials in the pillar region and in the cell region provides improved electrical properties to the electronic device containing the high-k dielectric materials due to the locations of the high-k dielectric materials. For instance, the wordline-wordline resistance between vertically adjacent conductive materials (e.g., wordlines, gates) in the electronic device is reduced because the additional space in the cell region, provided by moving a portion of the high-k dielectric material to the pillar region, is available for the conductive material. The increased amount of conductive material in the cell region reduces the wordline-wordline resistance between vertically adjacent conductive materials. Forming the high-k dielectric materials in both the pillar region and in the cell region also enables a shape of the conductive material (e.g., wordline, gate) to be tunable. For example, the conductive material may exhibit a substantially rectangular shape in cross-section or may exhibit a rounded shape in cross-section. The conductive material may, for example, define a wordline (e.g., gate) of the electronic device. By forming the cell high-k dielectric materials and the pillar high-k dielectric materials, the shape of the conductive material may be tailored by adjusting the shape of the cell high-k dielectric materials between the vertically adjacent conductive materials. The shape of the conductive material affects an effective gate length of the electronic device containing the electronic structure.

The following description provides specific details, such as material types, material thicknesses, and process conditions in order to provide a thorough description of embodiments described herein. However, a person of ordinary skill in the art will understand that the embodiments disclosed herein may be practiced without employing these specific details. Indeed, the embodiments may be practiced in conjunction with conventional fabrication techniques employed in the semiconductor industry. In addition, the description provided herein does not form a complete description of an electronic device or a complete process flow for manufacturing the electronic device and the structures described below do not form a complete electronic device. Only those process acts and structures necessary to understand the embodiments described herein are described in detail below. Additional acts to form a complete electronic device may be performed by conventional techniques.

Unless otherwise indicated, the materials described herein may be formed by conventional techniques including, but not limited to, spin coating, blanket coating, chemical vapor deposition (CVD), atomic layer deposition (ALD), plasma enhanced ALD, physical vapor deposition (PVD) (including sputtering, evaporation, ionized PVD, and/or plasma-enhanced CVD), or epitaxial growth. Alternatively, the materials may be grown in situ. Depending on the specific material to be formed, the technique for depositing or growing the material may be selected by a person of ordinary skill in the art. The removal of materials may be accomplished by any suitable technique including, but not limited to, etching (e.g., dry etching, wet etching, vapor etching), ion milling, abrasive planarization (e.g., chemical-mechanical planarization), or other known methods unless the context indicates otherwise.

Drawings presented herein are for illustrative purposes only, and are not meant to be actual views of any particular material, component, structure, electronic device, or electronic system. Variations from the shapes depicted in the drawings as a result, for example, of manufacturing techniques and/or tolerances, are to be expected. Thus, embodiments described herein are not to be construed as being limited to the particular shapes or regions as illustrated, but include deviations in shapes that result, for example, from manufacturing. For example, a region illustrated or described as box-shaped may have rough and/or nonlinear features, and a region illustrated or described as round may include some rough and/or linear features. Moreover, sharp angles that are illustrated may be rounded, and vice versa. Thus, the regions illustrated in the figures are schematic in nature, and their shapes are not intended to illustrate the precise shape of a region and do not limit the scope of the present claims. The drawings are not necessarily to scale. Additionally, elements common between figures may retain the same numerical designation.

As used herein, the singular forms "a," "an," and "the" are intended to include the plural forms as well, unless the context clearly indicates otherwise.

As used herein, "and/or" includes any and all combinations of one or more of the associated listed items.

As used herein, "about" or "approximately" in reference to a numerical value for a particular parameter is inclusive of the numerical value and a degree of variance from the numerical value that one of ordinary skill in the art would understand is within acceptable tolerances for the particular parameter. For example, "about" or "approximately" in reference to a numerical value may include additional numerical values within a range of from 90.0 percent to 110.0 percent of the numerical value, such as within a range of from 95.0 percent to 105.0 percent of the numerical value, within a range of from 97.5 percent to 102.5 percent of the numerical value, within a range of from 99.0 percent to 101.0 percent of the numerical value, within a range of from 99.5 percent to 100.5 percent of the numerical value, or within a range of from 99.9 percent to 100.1 percent of the numerical value.

As used herein, spatially relative terms, such as "beneath," "below," "lower," "bottom," "above," "upper," "top," "front," "rear," "left," "right," and the like, may be used for ease of description to describe one element's or feature's relationship to another element(s) or feature(s) as illustrated in the figures. Unless otherwise specified, the spatially relative terms are intended to encompass different orientations of the materials in addition to the orientation depicted in the figures. For example, if materials in the figures are inverted, elements described as "below" or "beneath" or "under" or "on bottom of" other elements or features would then be oriented "above" or "on top of" the other elements or features. Thus, the term "below" can encompass both an orientation of above and below, depending on the context in which the term is used, which will be evident to one of ordinary skill in the art. The materials may be otherwise oriented (e.g., rotated 90 degrees, inverted, flipped) and the spatially relative descriptors used herein interpreted accordingly.

As used herein, the term "cell high-k dielectric material" means and includes a high-k dielectric material in a cell region of the electronic structure.

As used herein, the term "cell region" means and includes a region of the electronic structure between neighboring pillar high-k dielectric materials and includes stacks of alternating dielectric materials and conductive materials, the cell high-k dielectric materials, and an optional etch stop material. Alternatively, the cell region includes stacks of alternating dielectric materials and nitride materials, the cell high-k dielectric material, and an optional etch stop material at an initial stage of forming the electronic structure.

As used herein, the term "configured" refers to a size, shape, material composition, and arrangement of one or more of at least one structure and at least one apparatus facilitating operation of one or more of the structure and the apparatus in a pre-determined way.

As used herein, the term "electronic device" includes, without limitation, a memory device, as well as semiconductor devices which may or may not incorporate memory, such as a logic device, a processor device, or a radiofrequency (RF) device. Further, an electronic device may incorporate memory in addition to other functions such as, for example, a so-called "system on a chip" (SoC) including a processor and memory, or an electronic device including logic and memory. The electronic device may, for example, be a 3D electronic device, such as a 3D NAND Flash memory device.

As used herein, the term "etch stop material" means and includes a material that is resistant to removal (e.g., etch) relative to removal of a nitride material of the stacks of alternating dielectric materials and nitride materials during fabrication of the stacks. The nitride material of the stacks is selectively removable (e.g., selectively etchable) relative to the etch stop material. The etch stop material is also selectively removable (e.g., selectively etchable) relative to exposed materials during a subsequently conducted process act (e.g., a replacement gate act).

As used herein, the term "high-k dielectric material" means and includes a dielectric oxide material having a dielectric constant greater than the dielectric constant of silicon oxide ($SiO_x$), such as silicon dioxide ($SiO_2$). The high-k dielectric material may include, but is not limited to, a high-k oxide material, a high-k metal oxide material, or a combination thereof. By way of example only, the high-k dielectric material may be aluminum oxide, gadolinium oxide, hafnium oxide, niobium oxide, tantalum oxide, titanium oxide, zirconium oxide, a combination thereof, or a combination of one or more of the listed high-k dielectric materials with silicon oxide.

As used herein, reference to an element as being "on" or "over" another element means and includes the element being directly on top of, adjacent to (e.g., laterally adjacent to, vertically adjacent to), underneath, or in direct contact with the other element. It also includes the element being indirectly on top of, adjacent to (e.g., laterally adjacent to, vertically adjacent to), underneath, or near the other element, with other elements present therebetween. In contrast, when an element is referred to as being "directly on" or "directly adjacent to" another element, no intervening elements are present.

As used herein, the term "pillar high-k dielectric material" means and includes a high-k dielectric material in a pillar region of the electronic structure.

As used herein, the term "pillar region" means and includes a region of the electronic structure between neighboring cell regions and includes the pillar high-k dielectric materials, charge blocking materials, nitride materials, tunnel dielectric materials, channel materials, and an insulative material.

As used herein, the term "selectively etchable" means and includes a material that exhibits a greater etch rate responsive to exposure to a given etch chemistry and/or process conditions relative to another material exposed to the same etch chemistry and/or process conditions. For example, the material may exhibit an etch rate that is at least about five times greater than the etch rate of another material, such as an etch rate of about ten times greater, about twenty times greater, or about forty times greater than the etch rate of the another material. Etch chemistries and etch conditions for selectively etching a desired material may be selected by a person of ordinary skill in the art.

As used herein, the term "stacks" means and includes a feature having one or more materials vertically adjacent to one another. The stacks may include alternating dielectric materials and conductive materials, such as alternating oxide materials and metal materials or alternating oxide materials and polysilicon materials. Alternatively, the stacks may include alternating dielectric materials and nitride materials, such as alternating oxide materials and silicon nitride materials.

As used herein, the term "substantially" in reference to a given parameter, property, or condition means and includes to a degree that one of ordinary skill in the art would understand that the given parameter, property, or condition is met with a degree of variance, such as within acceptable manufacturing tolerances. By way of example, depending on the particular parameter, property, or condition that is substantially met, the parameter, property, or condition may be at least 90.0% met, at least 95.0% met, at least 99.0% met, or even at least 99.9% met.

As used herein, the term "substrate" means and includes a material (e.g., a base material) or construction upon which additional materials are formed. The substrate may be a an electronic substrate, a semiconductor substrate, a base semiconductor layer on a supporting structure, an electrode, an electronic substrate having one or more materials, layers, structures, or regions formed thereon, or a semiconductor substrate having one or more materials, layers, structures, or regions formed thereon. The materials on the electronic substrate or semiconductor substrate may include, but are not limited to, semiconductive materials, insulating materials, conductive materials, etc. The substrate may be a conventional silicon substrate or other bulk substrate comprising a layer of semiconductive material. As used herein, the term "bulk substrate" means and includes not only silicon wafers, but also silicon-on-insulator ("SOI") substrates, such as silicon-on-sapphire ("SOS") substrates and silicon-on-glass ("SOG") substrates, epitaxial layers of silicon on a base semiconductor foundation, and other semiconductor or optoelectronic materials, such as silicon-germanium, germanium, gallium arsenide, gallium nitride, and indium phosphide. The substrate may be doped or undoped.

As used herein, the terms "vertical," "longitudinal," "horizontal," and "lateral" are in reference to a major plane of a structure and are not necessarily defined by Earth's gravitational field. A "horizontal" or "lateral" direction is a direction that is substantially parallel to the major plane of the structure, while a "vertical" or "longitudinal" direction is a direction that is substantially perpendicular to the major plane of the structure. The major plane of the structure is defined by a surface of the structure having a relatively large area compared to other surfaces of the structure.

Figure 1B:
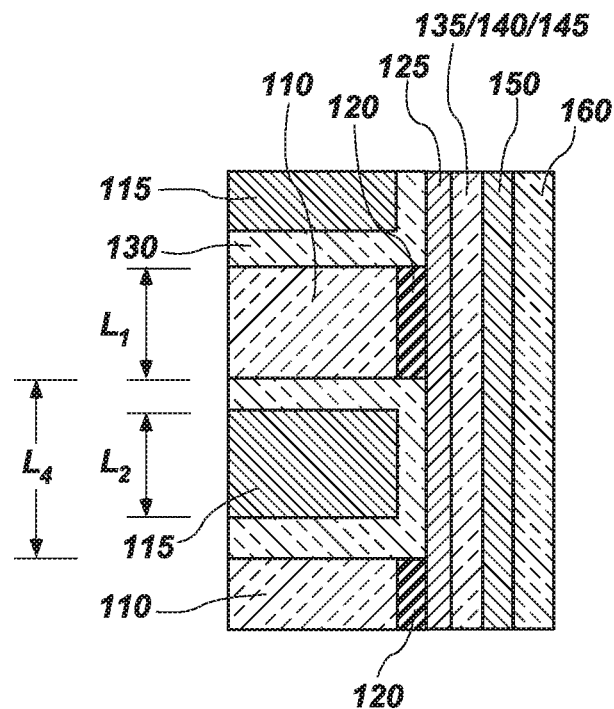

An electronic structure 100 according to embodiments of the disclosure and including the multiple high-k dielectric materials is shown in FIGS. 1A and 1B, where FIG. 1B is an enlarged view of the dashed region of FIG. 1A. The electronic structure 100 contains stacks 105 of alternating dielectric materials 110 and conductive materials 115, an optional etch stop material 120, a first high-k dielectric material 125 (e.g., a pillar high-k dielectric material 125), a second high-k dielectric material 130 (e.g., a cell high-k dielectric material 130), a charge blocking material 135, a storage node material 140, a tunnel dielectric material 145, a channel material 150, and an insulative material 160 (e.g., a fill material). The pillar high-k dielectric material 125 is present in the pillar region 170 of the electronic structure 100 and the cell high-k dielectric material 130 is present in the cell region 165 of the electronic structure 100. The pillar region 170 includes the pillar high-k dielectric materials 125, the charge blocking materials 135, the storage node materials 140, the tunnel dielectric materials 145, the channel materials 150, and the insulative material 160. The cell region 165 includes the dielectric materials 110, the conductive materials 115, the cell high-k dielectric materials 130, and the optional etch stop materials 120. Depending on the stage of fabrication, the electronic structure 100 contains stacks 105 of alternating dielectric materials 110 and conductive materials 115, or stacks 105 of alternating dielectric materials 110 and nitride materials 675 (see, for example, FIG. 6A).

The dielectric materials 110 have a length $L_1$ and the conductive materials 115 have a length $L_2$, where $L_1$ and $L_2$ may be substantially the same, $L_1$ may be greater than $L_2$, or $L_1$ may be less than $L_2$. The dielectric materials 110 of the stacks 105 may be silicon oxide, silicon nitride, silicon oxynitride, or other dielectric material. In some embodiments, the dielectric material 110 is silicon oxide. The conductive material 115 may function as a wordline of the electronic device containing the electronic structure 100. The conductive materials 115 of the stacks 105 may be any conductive material including, but not limited to, n-doped polysilicon, p-doped polysilicon, undoped polysilicon, or a metal. Locations of the conductive materials 115 correspond to where the nitride materials 675 (see, for example, FIG. 6A) of the stacks 105 are initially present during fabrication of the electronic structure 100. In some embodiments, the conductive material 115 is n-doped polysilicon. The conductive material 115 is isolated (e.g., electrically isolated) from other conductive materials in the electronic device by the cell high-k dielectric material 130 and the pillar high-k dielectric material 125. The stacks 105 may include multiple tiers of the alternating dielectric materials 110 and the conductive materials 115, such as greater than or equal to 50 tiers, greater than or equal to 100 tiers, greater than or equal to 200 tiers, or greater than or equal to 500 tiers. While FIGS. 1A and 1B include 3 tiers of the alternating dielectric materials 110 and the conductive materials 115, more tiers may be present.

The pillar high-k dielectric material 125 is present in the pillar region 170 of the electronic structure 100 and the cell high-k dielectric material 130 is present in the cell region 165 of the electronic structure 100. Adjoining portions of the pillar high-k dielectric material 125 and the cell high-k dielectric material 130 are laterally adjacent to (e.g., directly laterally adjacent to) one another but are not coextensive along an entire length of the pillar high-k dielectric material 125. The adjoining portions of the pillar high-k dielectric material 125 and the cell high-k dielectric material 130 are referred to herein as the combined high-k dielectric materials 125/130. The pillar high-k dielectric material 125 is between the cell high-k dielectric material 130 and the charge blocking material 135, and a portion (e.g., a vertical portion) of the cell high-k dielectric material 130 is between the first high-k dielectric material 125 and the conductive materials 115.

The pillar high-k dielectric material 125 extends a length $L_3$ of the stacks 105 (e.g., substantially an entire length of the stacks 105) and is on (e.g., laterally adjacent to, directly laterally adjacent to) the charge blocking material 135, such as on sidewalls (e.g., vertical surfaces) of the charge blocking material 135. The vertical portions of the cell high-k dielectric material 130 are on (e.g., laterally adjacent to, directly laterally adjacent to) the conductive material 115, such as on sidewalls (e.g., vertical surfaces) of the conductive material 115. Portions of the cell high-k dielectric material 130 are also on (e.g., horizontally adjacent to, directly horizontally adjacent to) horizontal surfaces of the conductive material 115. As shown in the view of FIG. 1A, the cell high-k dielectric material 130 is on horizontal surfaces and vertical surfaces of the conductive material 115 and substantially surrounds the conductive material 115. A length $L_4$ of the vertical portions of the cell high-k dielectric material 130 proximal to the pillar high-k dielectric material 125 is greater than the length $L_2$ of the conductive material 115. Since the cell high-k dielectric material 130 substantially surrounds the conductive material 115, an additional portion of the cell high-k dielectric material 130 extends beyond the length $L_2$ of the conductive material 115. The conductive material 115 includes substantially vertical sidewalls and substantially horizontal surfaces and, as shown in FIGS. 1A and 1B, upper and lower portions of the cell high-k dielectric material 130 on the sidewalls of the conductive material 115 extend above and below upper and lower surfaces of the conductive material 115. Upper and lower portions of the cell high-k dielectric material 130 on the horizontal surfaces of the conductive material 115 are substantially planar and are substantially parallel to one another. The conductive material 115 forms the wordline (e.g., the gate) having substantially the same dimensions (e.g., substantially the same length $L_2$) at opposite ends of the conductive material 115 and along the length $L_2$ of the conductive material 115. In other words, end portions of the conductive material 115 proximal to the neighboring pillar high-k dielectric material 125 and medial portions of the conductive material 115 exhibit substantially the same width $L_2$.

As shown most clearly in FIG. 1B, the portions of the pillar high-k dielectric material 125 and the cell high-k dielectric material 130 adjoin one another laterally adjacent to the conductive material 115 while other portions of the pillar high-k dielectric material 125 are laterally adjacent to the etch stop material 120, if present, or to the dielectric material 110. The cell high-k dielectric material 130 is substantially coextensive with the portion of the pillar high-k dielectric material 125, while the length $L_3$ of the pillar high-k dielectric material 125 is greater than the length $L_4$ of the cell high-k dielectric material 130. The entire length $L_4$ of the cell high-k dielectric material 130 is in direct contact with the pillar high-k dielectric material 125. The length $L_4$ of the cell high-k dielectric material 130 is equal to the length $L_2$ of the conductive material 115 plus two times a thickness of the cell high-k dielectric material 130. A first vertical surface of the cell high-k dielectric material 130 between the conductive material 115 and the pillar high-k dielectric material 125 directly contacts the conductive material 115 and a second vertical surface, opposing the first vertical surface, of the cell high-k dielectric material 130 directly contacts the pillar high-k dielectric material 125. Interfacial properties of the pillar high-k dielectric material 125 and the cell high-k dielectric material 130 may be sufficient for the combined high-k dielectric materials 125, 130 to exhibit the desired electrical performance properties of the electronic device containing the electronic structure 100. If the etch stop material 120 is present, a portion of the pillar high-k dielectric material 125 is directly laterally adjacent to the etch stop material 120. The etch stop material 120 may protect the pillar high-k dielectric material 125 from removal during a subsequently-conducted process act. If the etch stop material 120 is not present, the portion of the pillar high-k dielectric material 125 is directly laterally adjacent to the dielectric material 110.

Each of the pillar high-k dielectric material 125 and the cell high-k dielectric material 130 is a dielectric material having a dielectric constant greater than the dielectric constant of silicon dioxide. Each of the pillar high-k dielectric material 125 and the cell high-k dielectric material 130 may include, but is not limited to, aluminum oxide, hafnium oxide, zirconium oxide, tantalum oxide, a combination thereof, or a combination of silicon oxide and one or more of the listed materials. The pillar high-k dielectric material 125 and the cell high-k dielectric material 130 may be the same material. Alternatively, a different material may be used for each of the pillar high-k dielectric material 125 and the cell high-k dielectric material 130. By using different materials, erase performance properties and data retention over time properties of the electronic device containing the electronic structure 100 may be tailored.

A thickness of each of the pillar high-k dielectric material 125 and the cell high-k dielectric material 130 may be between about 1 nm to about 10 nm, such as between about 1 nm and about 4 nm, between about 1 nm and about 3 nm, between about 1 nm and about 2 nm, or between about 2 nm and about 4 nm, or between about 2 nm and about 3 nm. Alternatively, the thickness of one or more of the pillar high-k dielectric material 125 and the cell high-k dielectric material 130 may be less than about 1 nm, such as being a few monolayers in thickness. The combined thickness of the pillar high-k dielectric material 125 and the cell high-k dielectric material 130 may be sufficient to form a substantially continuous material over (e.g., adjacent to) exposed materials of the electronic structure 100 to protect these materials during subsequent process acts. The thickness of the cell high-k dielectric material 130 may be less than about 1 nm, such as being a few monolayers in thickness, depending on desired performance properties of the electronic device containing the electronic structure 100. To provide sufficient space in the cell region 165 of the electronic structure 100 for the conductive materials 115, the cell high-k dielectric material 130 may be between about 1 nm and about 2 nm thick and the pillar high-k dielectric material 125 may be between about 2 nm and about 4 nm thick.

The cell high-k dielectric material 130 may account for a smaller proportion of the total high-k dielectric material thickness (the thickness of the cell high-k dielectric material 130 and the thickness of the pillar high-k dielectric material 125) to achieve the desired performance properties of the electronic device. For instance, the total high-k dielectric material thickness of the pillar high-k dielectric material 125 and the cell high-k dielectric material 130 may be minimized to reduce effects on wordline resistance between vertically adjacent conductive materials 115. The cell high-k dielectric material 130 may be formed at a few monolayers in thickness, with the pillar high-k dielectric material 125 accounting for the remainder of the total high-k dielectric material thickness. With the total high-k dielectric material thickness being predominantly due to the thickness of the pillar high-k dielectric material 125, the effects on performance properties provided by the combined high-k dielectric materials 125/130 may be predominantly due to the properties of the pillar high-k dielectric material 125. The total thickness of the adjoining pillar high-k dielectric material 125 and the cell high-k dielectric material 130 may be between about 2 nm to about 20 nm, such as between about 2 nm and about 8 nm, between about 2 nm and about 6 nm, between about 2 nm and about 4 nm, or between about 4 nm and about 8 nm, or between about 4 nm and about 6 nm.

While embodiments described and illustrated herein refer to the pillar high-k dielectric material 125 and the cell high-k dielectric material 130 as being single materials, one or more of the pillar high-k dielectric material 125 and the cell high-k dielectric material 130 may include multiple materials, such as being a laminate of high-k dielectric materials. Each of the pillar high-k dielectric material 125 and the cell high-k dielectric material may be substantially homogeneous in chemical composition or may be heterogeneous in chemical composition.

As shown most clearly in FIG. 1B, the optional etch stop material 120 may be between the dielectric material 110 of the stacks 105 and the pillar high-k dielectric material 125, such as directly between the dielectric material 110 and the pillar high-k dielectric material 125. The material of the etch stop material 120 may be selected to be selectively removable (e.g., selectively etchable) relative to the dielectric material 110 and the pillar high-k dielectric material 125. However, the etch stop material 120 is not substantially removable during a previously-conducted process act in which the nitride material of the stacks 105 (e.g., stack nitride material 675) is removed, such as during the replacement gate process act, before forming the cell high-k dielectric material 130. By way of example only, substantially all of the etch stop material 120 may remain during removal of the nitride material 675. Subsequent to removal of the nitride material 675, some portions of the etch stop material 120 are selectively removed and other portions of the etch stop material 120 remain before the formation of the cell high-k dielectric material 130 occurs. The etch stop material 120 may include, but is not limited to, silicon oxide, silicon carbonitride, silicon oxycarbide, or a combination thereof.

The charge blocking material 135 is on (e.g., laterally adjacent to) the pillar high-k dielectric material 125, the storage node material 140 is on the charge blocking material 135, and the tunnel dielectric material 145 is on the storage node material 140. The channel material 150 is on the tunnel dielectric material 145 and the insulative material 160 is between neighboring channel materials 150. The charge blocking material 135 may include, but is not limited to, silicon dioxide, aluminum oxide, hafnium oxide, zirconium oxide, or a combination thereof. The storage node material 140 may include, but is not limited to, silicon nitride, silicon oxynitride, or a combination thereof. The tunnel dielectric material 145 may include, but is not limited to, silicon dioxide, aluminum oxide, hafnium oxide, zirconium oxide, or a combination thereof. In some embodiments, the charge blocking material 135, the storage node material 140, and the tunnel dielectric material 145 form an oxide-nitride-oxide (ONO) structure (e.g., an interlayer poly dielectric structure). The channel material 150 may be doped polysilicon, undoped polysilicon, or other material. In some embodiments, the channel material 150 is polysilicon. The insulative material 160 may be a dielectric material including, but not limited to, silicon dioxide, phosphosilicate glass, borosilicate glass, borophosphosilicate glass, fluorosilicate glass, titanium dioxide, hafnium oxide, zirconium dioxide, tantalum oxide, magnesium oxide, aluminum oxide, or a combination thereof.

Figure 2A:
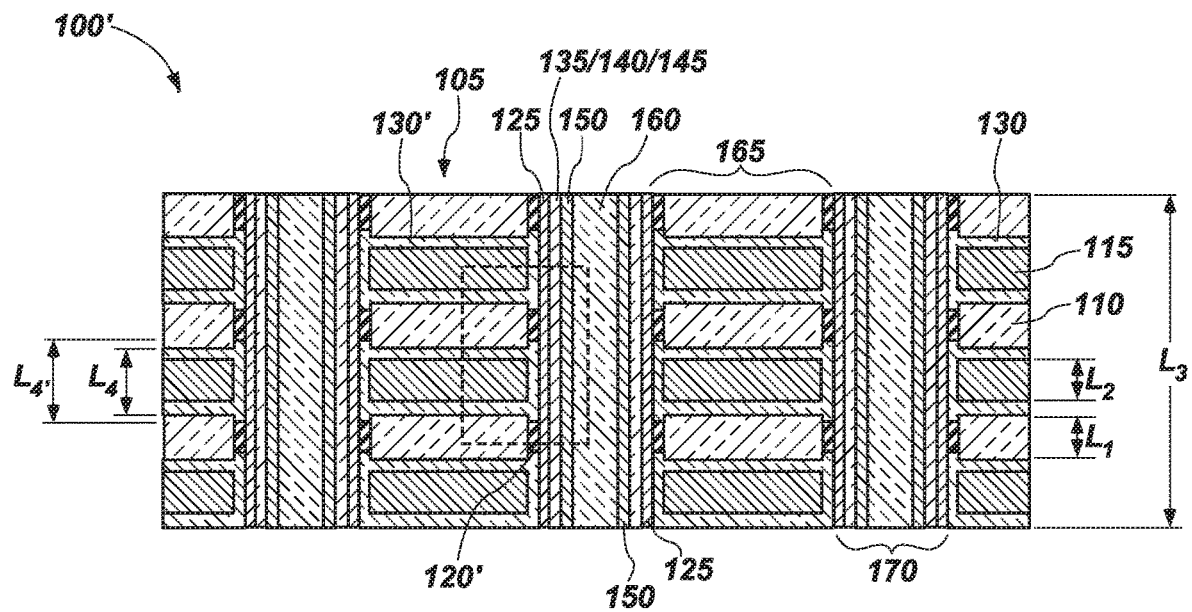
FIGS. 2A and 2B are cross-sectional views of electronic structures including multiple high-k dielectric materials according to other embodiments of the disclosure.
Figure 2B:
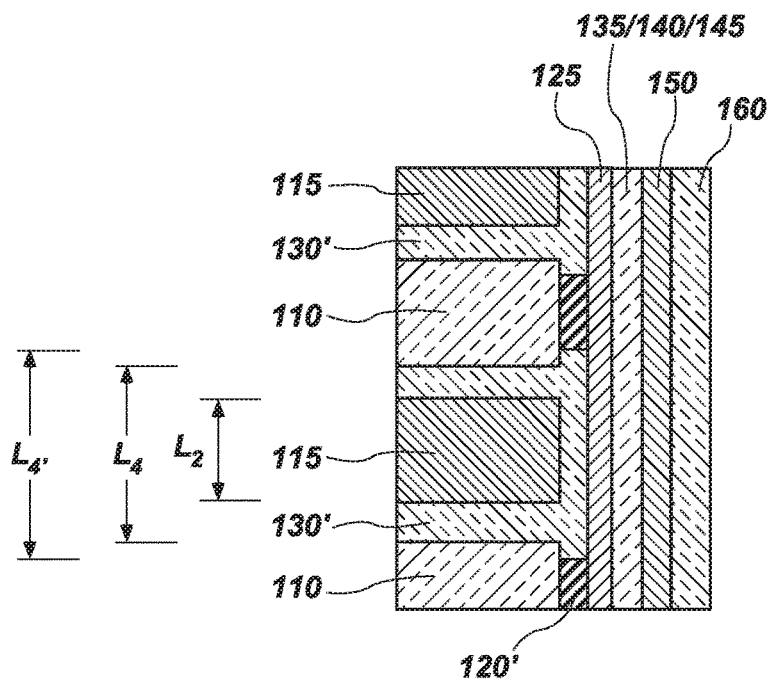

An electronic structure 100' according to other embodiments of the disclosure and including the multiple high-k dielectric materials 125, 130' is shown in FIGS. 2A and 2B.

The materials, material thicknesses, relative positions of the materials, etc. of the electronic structure 100' are as described above for FIGS. 1A and 1B. The electronic structure 100' differs from the electronic structure 100 in that the etch stop material 120' is present and a length $L_4'$ of the cell high-k dielectric material 130' is longer than the length $L_4$ of the cell high-k dielectric material 130 in FIGS. 1A and 1B. The cell high-k dielectric material 130' exhibits the length $L_4'$ proximal to the pillar high-k dielectric material 125 and the length $L_4$ distal to the pillar high-k dielectric material 125. The length $L_4'$ of the cell high-k dielectric material 130' in the electronic structure 100' is also longer than the length $L_4$ of the cell high-k dielectric material 130 in the electronic structure 100'. The cell high-k dielectric material 130' according to embodiments of the disclosure in FIGS. 2A and 2B extends a greater distance in the vertical direction than the cell high-k dielectric material 130 of the electronic structure 100 in FIGS. 1A and 1B. Therefore, the cell high-k dielectric material 130' adjoins (e.g., is directly adjacent to) a greater proportion of the pillar high-k dielectric material 125 compared to the proportion of adjoining high-k dielectric materials 125, 130 in the electronic structure 100 of FIGS. 1A and 1B. Portions of the etch stop material 120' are present between ends of the dielectric material 110 and the pillar high-k dielectric material 125. A length of the etch stop material 120' is shorter than a length of the etch stop material 120, when present, in the electronic structure 100 of FIGS. 1A and 1B. As shown in FIGS. 2A and 2B, the cell high-k dielectric material 130' on vertical sidewalls of the conductive material 115 extends above and below the cell high-k dielectric material 130' on horizontal surfaces of the conductive material 115. In comparison to the electronic structure 100 of FIGS. 1A and 1B, portions of the cell high-k dielectric material 130' proximal to the pillar high-k dielectric materials 125 protrude above and below the cell high-k dielectric material 130' on the horizontal surfaces of the conductive material 115. Similar to the electronic structure 100 of FIGS. 1A and 1B, the conductive material 115 also includes substantially linear sidewalls and substantially horizontal upper and lower surfaces. Therefore, the conductive material 115 in the electronic structure 100' forms, for example, the wordline having substantially the same dimensions (e.g., substantially the same length $L_2$) at opposite ends of the conductive material 115 as at medial portions of the conductive material 115, similar to the electronic structure 100 of FIGS. 1A and 1B. In both the electronic structures 100, 100', the conductive material 115 has a substantially rectangular shape in cross-section and its length $L_2$ is substantially uniform between neighboring pillar regions 170.

Figure 3A:
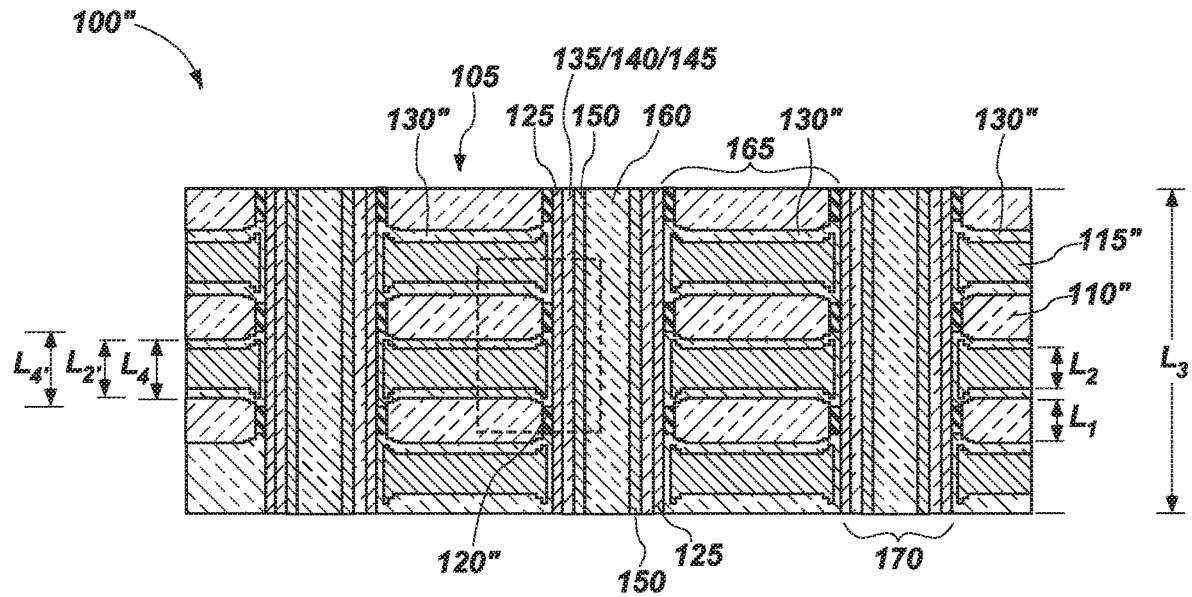
FIGS. 3A and 3B are cross-sectional views of electronic structures including multiple high-k dielectric materials according to yet other embodiments of the disclosure.
Figure 3B:
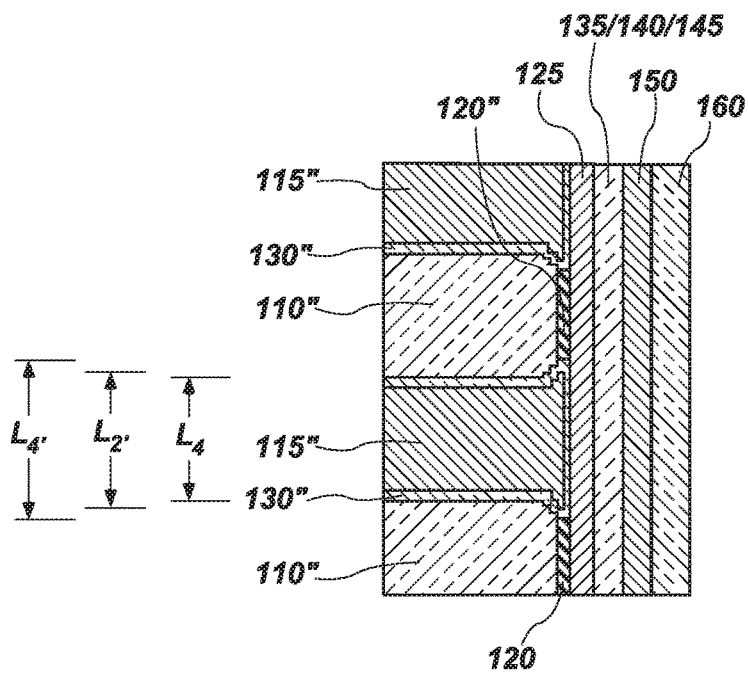

An electronic structure 100" according to other embodiments of the disclosure and including the multiple high-k dielectric materials 125, 130' is shown in FIGS. 3A and 3B. The materials, material thicknesses, relative positions of the materials, etc. of the electronic structure 100" are as described above for the electronic structure 100 in FIGS. 1A and 1B. The electronic structure 100" differs from the electronic structure 100 in that the etch stop material 120" is present. The electronic structure 100" also differs in that the length $L_4'$ of the cell high-k dielectric material 130" proximal to the pillar high-k dielectric material 125 is longer than the length $L_4$ of the cell high-k dielectric material 130 in FIGS. 1A and 1B, and a length $L_2'$ of the conductive material 115" is longer than the length $L_2$ of the conductive material 115 in FIGS. 1A and 1B. The length $L_4'$ of the cell high-k dielectric material 130" is also longer than the length $L_4$ of the cell high-k dielectric material 130" distal to the pillar high-k dielectric material 125. The electronic structure 100" also differs from the electronic structures 100, 100' in that the conductive material 115" includes non-linear (e.g., rounded) surfaces proximal to the pillar region 170. The electronic structure 100" differs from the electronic structures 100, 100' in that portions of both the conductive material 115" and the cell high-k dielectric material 130" protrude above and below the horizontal surfaces of the conductive material 115". For instance, the portions of the conductive material 115" and the cell high-k dielectric material 130" proximal to the pillar high-k dielectric materials 125 extend above and below the horizontal surfaces of the conductive material 115". Therefore, the conductive materials 115" and the cell high-k dielectric materials 130" have increased lengths $L_2'$, $L_4'$, respectively, proximal to the pillar region 170 compared to lengths of comparable materials of the electronic structures 100, 100'. By increasing the length of the conductive material 115", but only in locations proximal to the pillar region 170, the effective gate lengths proximal to the pillar high-k dielectric materials 125 are increased. The length of the conductive material 115" in locations distal to the pillar high-k dielectric materials 125 (e.g., distal to the pillar region 170) is the length $L_2$. Therefore, the conductive material 115" forms a wordline (e.g., a gate) having a greater length $L_2'$ proximal to the pillar region 170 than the length $L_2$ distal to the pillar region 170. Therefore, the effective gate length proximal to the pillar high-k dielectric materials 125 is increased without also increasing the effective gate length in portions of the conductive material 115 distal to the pillar high-k dielectric material 125. By increasing the effective gate length only proximal to the pillar region 170, coupling between adjacent conductive materials 115" is decreased.

The cell high-k dielectric material 130" also extends a greater distance in the vertical direction than the cell high-k dielectric material 130 of the electronic structure 100 in FIGS. 1A and 1B. Therefore, the cell high-k dielectric material 130" is adjoined to a greater proportion of the pillar high-k dielectric material 125 relative to the portion adjoined in the electronic structure 100 of FIGS. 1A and 1B. Portions of the etch stop material 120" are present between vertically adjacent cell high-k dielectric material 130" proximal to the pillar high-k dielectric materials 125. As shown in FIGS. 3A and 3B, the cell high-k dielectric material 130" on the vertical sidewalls of the conductive material 115" extends above and below the cell high-k dielectric material 130" on the horizontal surfaces (e.g., medial portions) of the conductive material 115". In addition, portions of the conductive material 115" proximal to the pillar high-k dielectric materials 125 are substantially equal to or extend above and below surfaces of the cell high-k dielectric material 130" on the horizontal surfaces of the conductive material 115". In contrast to the electronic structure 100 of FIGS. 1A and 1B, the portions of the cell high-k dielectric material 130" protrude above and below the cell high-k dielectric material 130" on the horizontal surfaces of the conductive material 115" proximal to the pillar high-k dielectric materials 125. Similar to the electronic structure 100' of FIGS. 2A and 2B, the portions of the cell high-k dielectric material 130" proximal to the pillar high-k dielectric materials 125 protrude above and below the horizontal surfaces of the conductive material 115". Portions of the conductive material 115" proximal to the pillar high-k dielectric materials 125 also protrude above and below the horizontal surfaces of the conductive material 115". By increasing the length $L_2'$ of the conductive material 115", but only in locations proximal to the pillar region 170, the effective gate length proximal to the pillar high-k dielectric material 125 is increased. The gate defined by the conductive material 115" has a greater length $L_2'$ proximal to the pillar high-k dielectric materials 125 than distal to the pillar high-k dielectric materials 125. The conductive material 115" also includes non-linear (e.g., rounded) surfaces proximal to the pillar high-k dielectric materials 125 while the surfaces of the medial portions of the conductive material 115" are substantially parallel to one another. The increased lengths $L_2'$, $L_4'$ of the conductive material 115" and the cell high-k dielectric material 130", respectively, proximal to the pillar region 170 provides the electronic structure 100" with an increased effective gate length compared to conventional electronic devices.

Figure 4A:
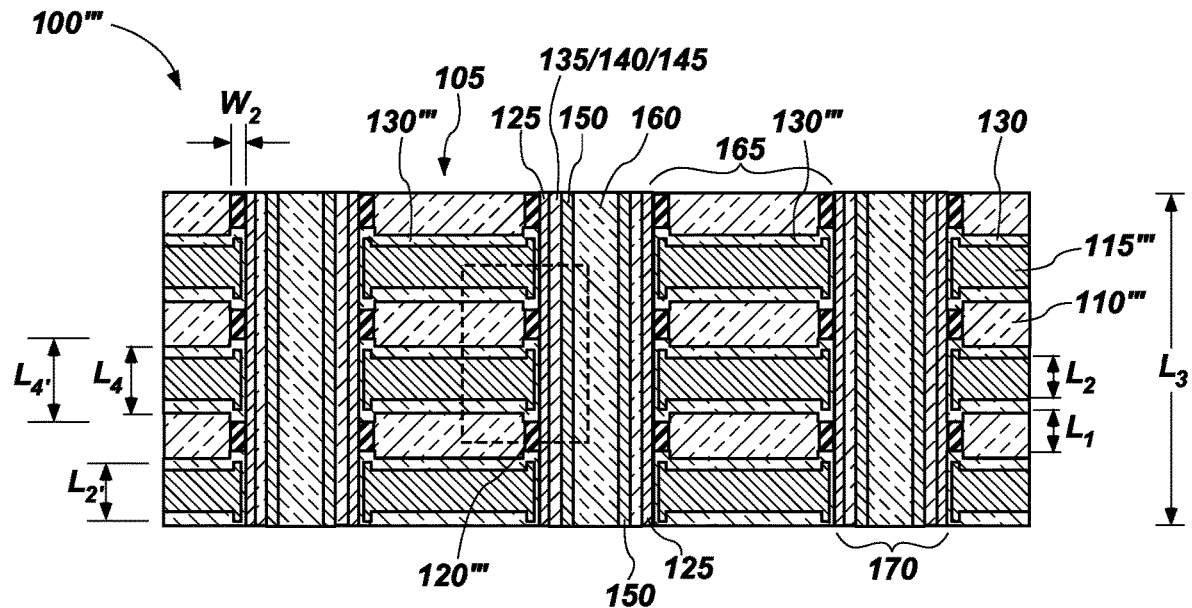
FIGS. 4A and 4B are cross-sectional views of electronic structures including multiple high-k dielectric materials according to embodiments of the disclosure.
Figure 4B:
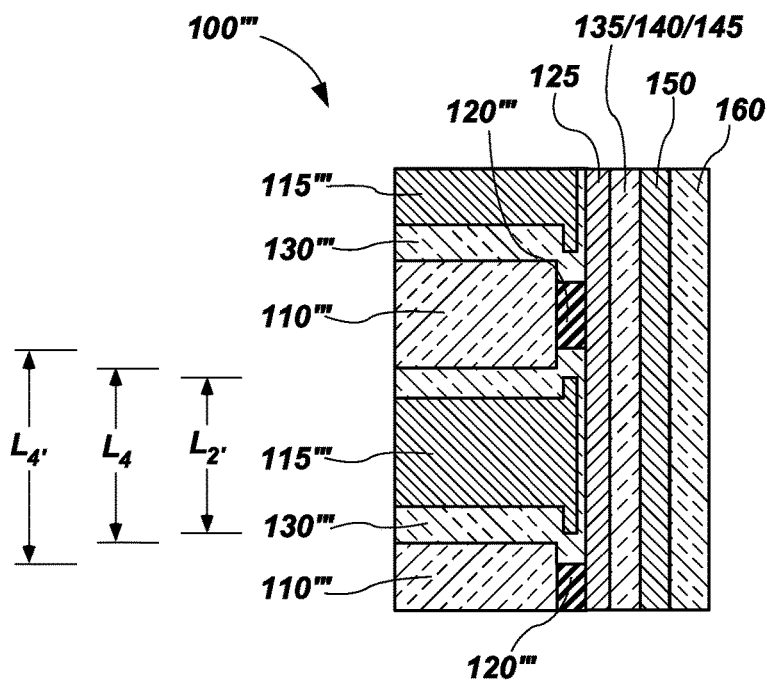

An electronic structure 100''' according to other embodiments of the disclosure and including the multiple high-k dielectric materials 125, 130''' is shown in FIGS. 4A and 4B. The materials, material thicknesses, relative positions of the materials, etc. of the electronic structure 100''' are as described above for FIGS. 1A and 1B. The electronic structure 100''' differs from the electronic structure 100 in that the etch stop material 120''' is present and a width $W_2$ of the etch stop material 120''' is greater than a width $W_1$ of the etch stop material 120, if present, in FIGS. 1A and 1B. The greater width $W_2$ enables the lengths $L_2'$, $L_4'$ of the conductive material 115''' and cell high-k dielectric material 130''', respectively, to be greater than the lengths $L_2$, $L_4$ of the conductive material 115' and cell high-k dielectric material 130''', respectively. The electronic structure 100''' differs from the electronic structures 100, 100' in that the conductive material 115 includes non-linear (e.g., rounded) surfaces proximal to the pillar high-k dielectric material 125. The electronic structure 100''' also differs from the electronic structures 100, 100' in that portions of both the conductive material 115''' and the cell high-k dielectric material 130''' protrude above and below the surfaces of the conductive material 115'''. The portions of the conductive material 115' and the cell high-k dielectric material 130''' proximal to the pillar region 170 in the electronic structures 100''' extend above and below the horizontal surfaces of the conductive material 115'''. By increasing the length $L_2'$ of the conductive material 115''' proximal to the pillar high-k dielectric materials 125, the effective gate length is increased compared to conventional electronic devices, without also increasing the effective gate length in medial portions of the conductive material 115'''. By increasing the effective gate length only proximal to the pillar region 170, coupling between adjacent conductive materials 115''' is decreased. Furthermore, the conductive material 115' defines a gate having different dimensions proximal to the pillar high-k dielectric materials 125 than in medial portions of the conductive material 115'''. The electronic structure 100' differs from the electronic structures 100', 100" in that the etch stop material 120''' has a greater dimension (e.g., width $W_2$) than the corresponding material of the electronic structures 100, 100', 100". The greater width of the etch stop material 120''' enables a larger recess 790 (see FIG. 8B) vertically adjacent to the etch stop material 120''' to be formed, in which both the conductive material 115''' and the cell high-k dielectric material 130''' are ultimately formed. The electronic structure 100''' differs from the electronic structure 100" in that a greater amount of the cell high-k dielectric material 130''' and the conductive material 115''' may be present in the recesses 790 since the initially formed etch stop material 120''' is thicker. The greater dimensions and rounded shape of the recesses 790 may enable the additional cell high-k dielectric material 130' and conductive material 115''' to be formed in the recesses 790 compared to that in the electronic structures 100". By forming the conductive material 115''' and the cell high-k dielectric material 130''' in the recesses 790, the non-linear (e.g., rounded) surfaces of the gate are produced.

Portions of the etch stop material 120''' are present between vertically adjacent conductive materials 115''' and the cell high-k dielectric materials 130''' proximal to the pillar high-k dielectric materials 125. The width $W_2$ of the etch stop material 120''' is greater than the thickness of the cell high-k dielectric material 130'''. Therefore, sidewalls of the etch stop material 120''' proximal to the dielectric material 110''' and sidewalls of the cell high-k dielectric material 130''' proximal to the conductive material 115''' are not substantially aligned. In contrast, the sidewalls of the etch stop material 120 of the electronic structure 100 are substantially aligned with the outer surface of the cell high-k dielectric material 130, as seen with the electronic structure 100 in FIGS. 1A and 1B. In other words, the vertical sidewalls of the etch stop material 120''' and the vertical sidewalls of the cell high-k dielectric material 130''' proximal to the medial portions of the conductive material 115''' and the cell high-k dielectric material 130''' are not substantially coplanar with one another. The cell high-k dielectric material 130''' substantially surrounds the conductive material 115''' in the view of FIG. 4A. The lengths $L_2'$, $L_4'$ of the conductive material 115''' and the cell high-k dielectric material 130''', respectively, proximal to the pillar region 170 are greater than the lengths $L_2$, $L_4$ of the conductive material 115''' and the cell high-k dielectric material 130''', respectively, distal to the pillar region 170. Since the cell high-k dielectric material 130''' surrounds the conductive material 115''' and the length of the conductive material 115''' proximal to the pillar high-k dielectric material 125 is greater than the length in medial portions of the conductive material 115''', an additional portion of the cell high-k dielectric material 130''' and the conductive material 115''' extends beyond the length $L_2$ of the conductive material 115'''. The conductive material 115''' includes substantially vertical sidewalls and substantially horizontal surfaces in its medial portion. However, and as shown in FIGS. 4A and 4B, upper and lower surfaces of the cell high-k dielectric material 130''' on the sidewalls of the conductive material 115''' extend above and below upper and lower surfaces of the medial portions of the conductive material 115'''.

As shown in FIGS. 4A and 4B, the length $L_4$ of the cell high-k dielectric material 130''' is substantially coextensive with the length $L_3$ of the pillar high-k dielectric material 125, while the length $L_3$ of the pillar high-k dielectric material 125 is greater than the length $L_4'$ of the cell high-k dielectric material 130'''. For instance, an entire length $L_4'$ of the cell high-k dielectric material 130''' proximal to the conductive material 115''' is in direct contact with the pillar high-k dielectric material 125. The first vertical surface of the cell high-k dielectric material 130''' directly contacts the conductive material 115''' and the second vertical surface, opposing the first vertical surface, of the cell high-k dielectric material 130''' directly contacts the pillar high-k dielectric material 125. The conductive material 115''' proximal to the pillar high-k dielectric material 125 exhibits a greater length $L_2'$ than the length $L_2$ of the medial portion of the conductive material 115". In contrast to the electronic structure 100' of FIGS. 2A and 2B, the cell high-k dielectric material 130''' and the conductive material 115''' proximal to the pillar high-k dielectric materials 125 exhibit a rounded cross-sectional shape rather than the substantially rectangular cross-sectional shape of the cell high-k dielectric material 130' and the conductive material 115' of the electronic structure 100'. Similar to the electronic structure 100" of FIGS. 3A and 3B, the conductive material 115''' includes rounded surfaces proximal to the pillar high-k dielectric material 125.

The electronic structures 100'', 100''' also have greater effective gate lengths than the electronic structures 100, 100' since the length $L_2'$ of the conductive materials 115'', 115''' proximal to the pillar region 170 in the electronic structures 100'', 100''' is greater than the length $L_2$ of the conductive materials 115, 115' proximal to the pillar region 170 in the electronic structures 100, 100'. The increased effective gate lengths of the electronic structures 100'', 100''' are achieved without increasing the length $L_2$ of the medial portions of the conductive materials 115'', 115'''. Therefore, coupling between vertically adjacent conductive materials 115'', 115''' does not increase. The electronic structures 100'', 100''' also have increased amounts of the conductive material 115'', 115''' relative to the electronic structures 100, 100' since the conductive materials 115'', 115''' are also present in the recesses 790. In some embodiments, therefore, the conductive material 115 proximal to the pillar region 170 exhibits substantially the same dimension (e.g., length $L_2$) as the conductive material 115 distal to the pillar high-k dielectric material. In other embodiments, the conductive materials 115'', 115''' proximal to the pillar region 170 exhibit a greater length $L_2'$ than the length $L_2$ of the conductive material 115'', 115''' distal to the pillar region 170.

Figure 5D:
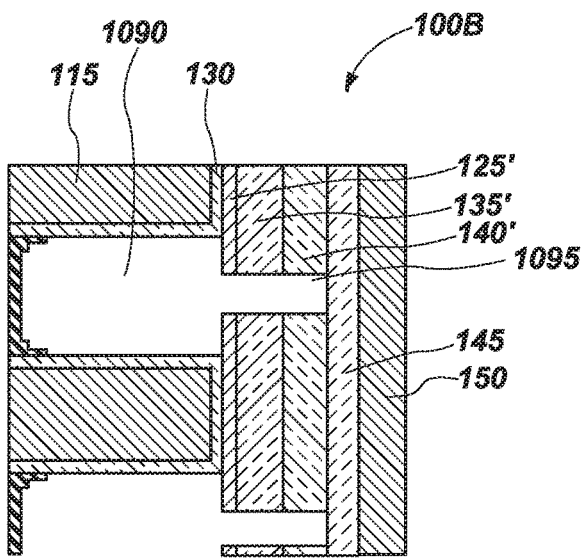
Figure 5E:
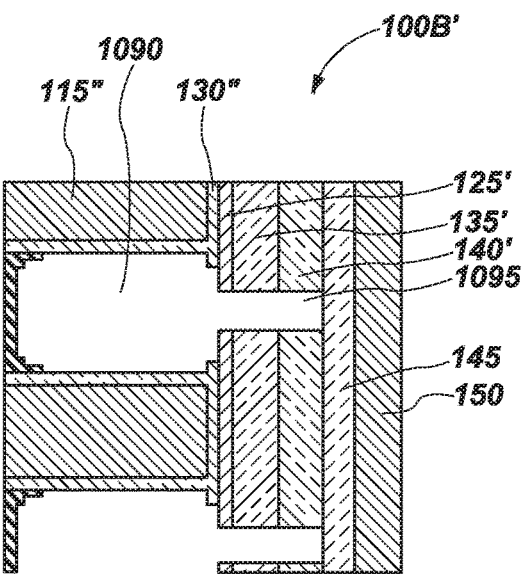
Figure 5F:
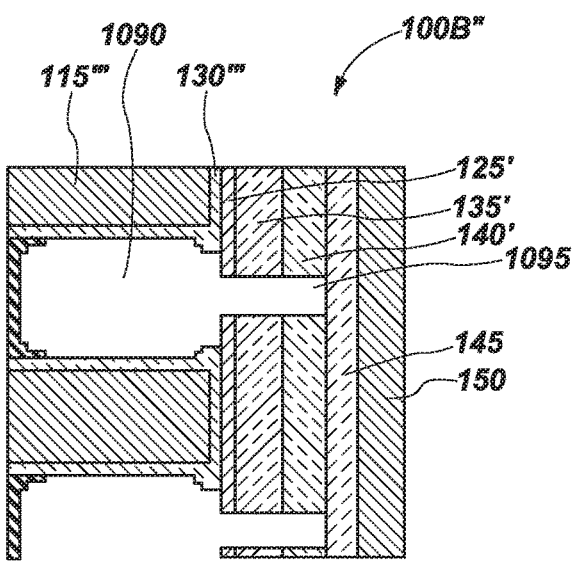

The electronic structures 100, 100', 100'', 100''' according to embodiments of the disclosure may also be used in electronic structures 100A, 100A', 100A'', 100B, 100B', 100B'' that include one or more of air gaps 1090 (e.g., voids) or storage node 1095, as shown in FIGS. 5A1-5F. The air gaps 1090 or storage node 1095 are incorporated into the electronic structures 100A, 100A', 100A'', 100B, 100B', 100B'' by conventional techniques. FIGS. 5A1-5C2 illustrate the electronic structures 100A (FIGS. 5A1, 5A2), 100A' (FIGS. 5B1, 5B2), and 100A'' (FIGS. 5C1, 5C2), with electronic structure 100A including the air gaps 1090 in combination with the electronic structure 100, electronic structure 100A' including the air gaps 1090 in combination with the electronic structure 100', and electronic structure 100A'' including the air gaps 1090 in combination with the electronic structure 100'', respectively. The etch stop material 120 may be present in the electronic structures 100A (FIG. 5A1), 100A' (FIG. 5B1), and 100A'' (FIG. 5C1) or the electronic structures 100A (FIG. 5A2), 100A' (FIG. 5B2), and 100A'' (FIG. 5C2) may lack the etch stop material 120. The air gaps 1090 are defined by horizontal surfaces of the second high-k dielectric material 130 and vertical surfaces of the etch stop material 120 or vertical surfaces of the pillar high-k dielectric material 125, if the etch stop material 120 is not present. FIGS. 5D-5F illustrate the electronic structures 100B (FIG. 5D), 100B' (FIG. 5E), and 100B'' (FIG. 5F), with electronic structure 100B including the air gaps 1090 and storage node 1095 in combination with the electronic structure 100, electronic structure 100B' including the air gaps 1090 and storage node 1095 in combination with the electronic structure 100', and electronic structure 100B'' including the air gaps 1090 and storage node 1095 in combination with the electronic structure 100'', respectively. The storage node 1095 is defined by horizontal surfaces of the pillar high-k dielectric material 125', the charge blocking material 135', and the nitride material 140' and vertical surfaces of the tunnel dielectric material 145, and the air gaps 1090 are defined by horizontal surfaces of the second high-k dielectric material 130, vertical surfaces of the etch stop material 120, 120'', 120''', and the storage node 1095.

Accordingly, an electronic structure is disclosed. The electronic structure comprises stacks comprising alternating dielectric materials and conductive materials in a cell region of the electronic structure. A pillar high-k dielectric material is adjacent to the stacks and in a pillar region of the electronic structure. A charge blocking material, a nitride material, a tunnel dielectric material, and a channel material are adjacent to the pillar high-k dielectric material in the pillar region of the electronic structure. A cell high-k dielectric material surrounds the conductive materials in the cell region of the electronic structure. The cell high-k dielectric material adjoins a portion of the pillar high-k dielectric material.

Accordingly, another electronic structure is disclosed. The electronic structure comprises stacks comprising conductive materials adjacent to one another and separated by air gaps, the stacks in a cell region of the electronic structure. A cell high-k dielectric material is in the cell region and surrounds the conductive materials. A pillar high-k dielectric material is adjacent to the stacks and in a pillar region of the electronic structure. The pillar high-k dielectric material adjoins a portion of the cell high-k dielectric material. A charge blocking material, a nitride material, a tunnel dielectric material, and a channel material are adjacent to the pillar high-k dielectric material and in the pillar region of the electronic structure.

Figure 6A:
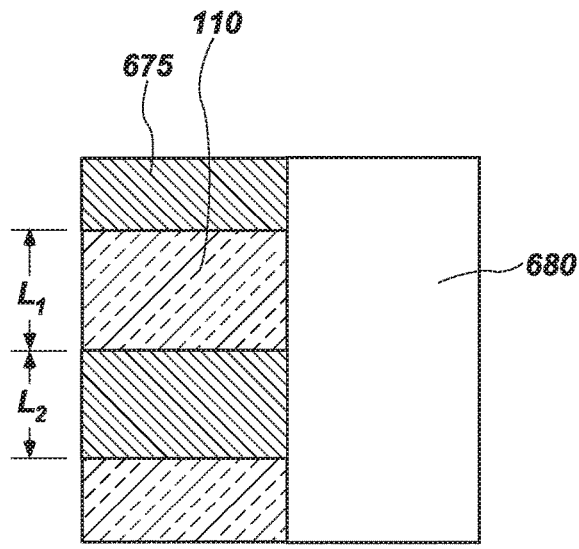
FIGS. 6A-6F are cross-sectional views that illustrate forming the electronic structures of FIGS. 1A and 1B.

The electronic structure 100 of FIGS. 1A and 1B may be formed as shown in FIGS. 6A-6F. To form the electronic structure 100, alternating dielectric materials 110 and nitride materials 675 of the stacks 105 are formed by conventional techniques. The nitride materials 675 may, for example, be silicon nitride. A portion of the dielectric materials 110 and nitride materials 675 is removed (e.g., etched) to form the stacks 105, with adjacent stacks 105 separated from one another by pillar openings 680, as shown in FIG. 6A. The pillar openings 680 are formed by conventional techniques, such as by etching the dielectric materials and nitride materials using conventional photolithography and etching techniques. The materials of the stacks 105 may, for example, be exposed to an anisotropic etch process, such as a dry plasma etch process or a reactive ion etch process, to form the stacks 105. Conventional etch chemistries and etch conditions may be used to form the stacks 105 and the pillar openings 680. The stacks 105 may be high aspect ratio (HAR) features having an aspect ratio (i.e., a ratio of width to depth) of greater than or equal to about 5:1, such as from about 5:1 to about 100:1, from about 5:1 to about 50:1, from about 10:1 to about 40:1, from about 10:1 to about 30:1, from about 10:1 to about 20:1, from about 20:1 to about 50:1, from about 20:1 to about 40:1, or from about 20:1 to about 30:1. The pillar openings 680 may also exhibit a high aspect ratio. In addition to the stacks 105 being configured as lines (e.g., wordlines), other configurations may be contemplated.

Figure 6B:
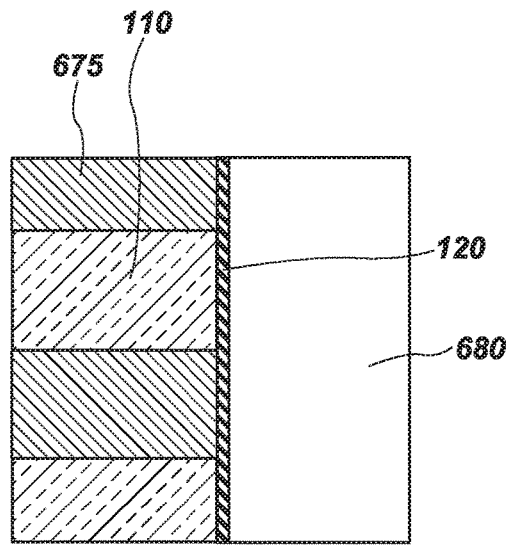
Figure 6C:
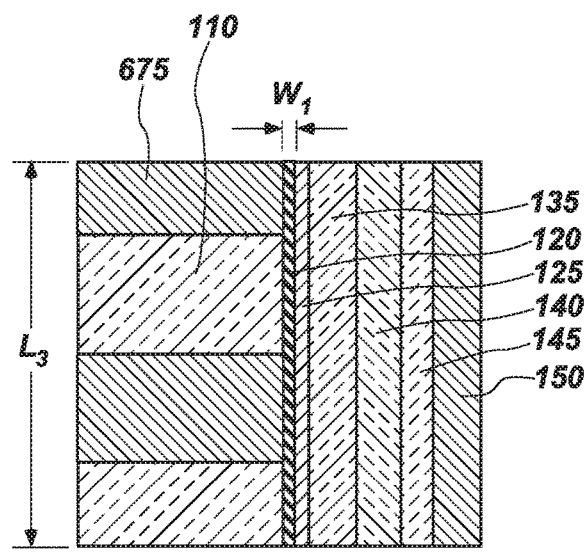

The etch stop material 120, if present, may be formed on the stacks 105, such as on sidewalls of the stacks 105 as shown in FIG. 6B. The etch stop material 120 may be formed by conventional techniques and extend the length $L_3$ of the stack 105. If no etch stop material 120 is present, the pillar high-k dielectric material 125 may be formed on the sidewalls of the nitride materials 675 and the dielectric materials 110. The pillar high-k dielectric material 125 may be formed by conventional techniques on the etch stop material 120, such as on sidewalls of the etch stop material 120 as shown in FIG. 6C. The pillar high-k dielectric material 125 may extend the length $L_3$ of the stack 105. The charge blocking material 135, the storage node material 140, and the tunnel dielectric material 110 may be sequentially formed on the pillar high-k dielectric material 125, such as on sidewalls of the pillar high-k dielectric material 125 and extend the length of the pillar high-k dielectric material 125. The channel material 150 may be formed on the tunnel dielectric material 110, such as on sidewalls of the tunnel dielectric material 110, and the insulative material 160 (not shown in FIGS. 6A-6F) may be formed in the remaining portion of the openings 680. The charge blocking material 135, the storage node material 140, and the tunnel dielectric material 110 may be formed the entire length $L_3$ of the stack 105, forming, for example, the ONO structure. The charge blocking material 135, the storage node material 140, and the tunnel dielectric material 110 may be formed by conventional techniques. The etch stop material 120, the pillar high-k dielectric material 125, the charge blocking material 135, the storage node material 140, and the tunnel dielectric material 110 may be conformally formed, such as by CVD or by ALD.

Figure 6D:
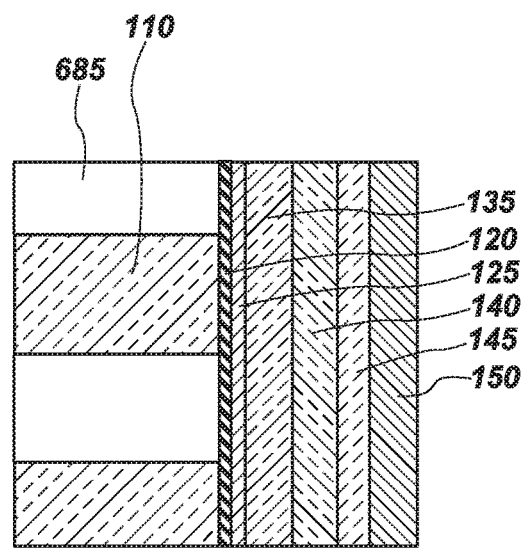

As shown in FIG. 6D, the nitride materials 675 may be removed (e.g., exhumed, etched), exposing the etch stop material 120, if present, and forming openings 685 between vertically adjacent dielectric materials 110 of the stacks 105. The nitride materials 675 may be removed by conventional techniques, such as by a wet etch process. Conventional etch chemistries and etch conditions may be used to remove the nitride materials 675. The etch chemistry and etch conditions may be selected depending on the material used for the nitride materials 675 and the etch stop material 120 (if present). The etch chemistry and etch conditions may selectively remove the nitride materials 675 without substantially removing the etch stop material 120 (if present) or the dielectric material 110. The etch stop material 120 may protect the pillar high-k dielectric material 125 during, for example, the wet etch process. If no etch stop material 120 is present, the nitride materials 675 may be selectively removed without substantially removing the pillar high-k dielectric material 125. The etch chemistry and etch conditions may be selected such that the pillar high-k dielectric material 125 is exposed after removing the nitride materials 675, with only a minimal portion of the pillar high-k dielectric material 125 removed.

Figure 6E:
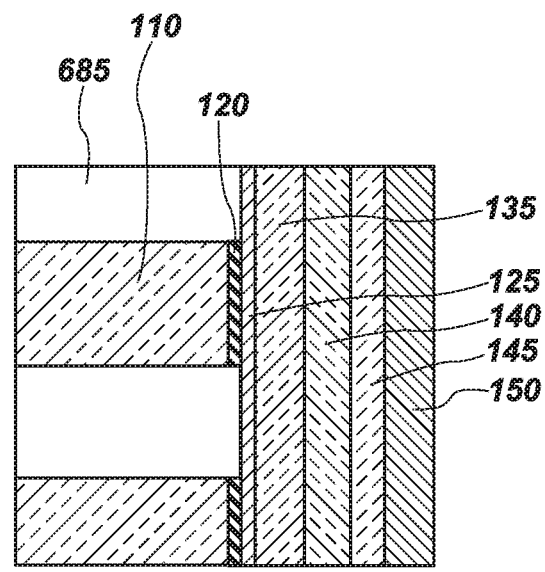

Portions of the etch stop material 120 (if present) may be selectively removed, as shown in FIG. 6E, to expose the pillar high-k dielectric material 125. Portions of the etch stop material 120 may remain adjacent to (e.g., laterally adjacent to) the dielectric material 110. Therefore, the etch stop material 120 separates the dielectric material 110 from the pillar high-k dielectric material 125. A conventional etch chemistry and etch conditions may be used to selectively remove the etch stop material 120. The etch chemistry and etch conditions may be selected such that the desired portions of the etch stop material 120 are removed without substantially removing the pillar high-k dielectric material 125 and the dielectric material 110, which are exposed.

Figure 6F:
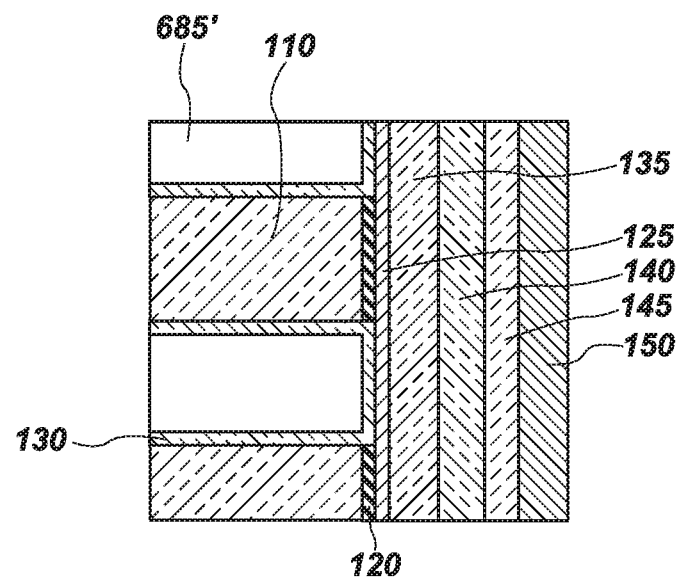

The cell high-k dielectric material 130 may be formed adjacent to (e.g., over) the dielectric material 110 and the pillar high-k dielectric material 125, as shown in FIG. 6F. The cell high-k dielectric material 130 may be conformally formed on exposed horizontal surfaces of the dielectric material 110 and exposed vertical surfaces of the pillar high-k dielectric material 125. The cell high-k dielectric material 130 may, for example, be formed by ALD. The cell high-k dielectric material 130 is formed in a portion of the openings 685 and is in direct contact with the pillar high-k dielectric material 125 along the vertical surfaces of the pillar high-k dielectric material 125. With multiple high-k dielectric materials 125, 130 present in these locations, the total thickness of the high-k dielectric materials 125, 130 in these locations is greater than the thickness of the pillar high-k dielectric material 125 and of the cell high-k dielectric material 130 in other locations.

By forming the pillar high-k dielectric material 125 and the cell high-k dielectric material 130 at different stages in the fabrication process, different high-k dielectric materials may be used, which provides increased flexibility to the fabrication process. However, the pillar high-k dielectric material 125 and the cell high-k dielectric material 130 may be formed of the same high-k dielectric material. In addition, one or more treatment acts may be conducted on one or more of the high-k dielectric materials since the pillar high-k dielectric material 125 and the cell high-k dielectric material 130 are formed separately. For instance, the treatment act may be conducted after forming the pillar high-k dielectric material 125 but before forming the cell high-k dielectric material 130, or after forming both the pillar high-k dielectric material 125 and the cell high-k dielectric material 130. Using different high-k dielectric materials for each of the pillar high-k dielectric material 125 and the cell high-k dielectric material 130 also enables tailoring the electrical properties of the electronic device.

After forming the cell high-k dielectric material 130, the conductive material 115 may be formed in the remaining portion of the openings 685', forming the electronic structure 100 (see FIG. 1B). The conductive material 115 may be formed by conventional techniques. The conductive material 115 may substantially fill the remaining portion of the openings 685'. Therefore, the cell high-k dielectric material 130 and the conductive material 115 substantially fill the openings 685 formed following the removal of the nitride materials 675. The conductive material 115 exhibits a substantially rectangular cross-sectional shape.

By including the high-k dielectric materials 125, 130 in the pillar region 170 and in the cell region 165 of the electronic structure 100 according to embodiments of the disclosure, the amount of conductive material 115 in the openings 685' may be increased relative to the amount of conductive material present in conventional structures where the high-k dielectric material is only present in a cell region. The electronic structure 100 according to embodiments of the disclosure, therefore, provides additional space for the conductive material 115 without negatively affecting electrical performance properties of the electronic device containing the electronic structure 100. Since the high-k dielectric materials 125, 130 are formed separately and in different regions of the electronic structure 100, the formation of the high-k dielectric materials 125, 130 may be easily integrated into the formation of the electronic structure 100.

During the fabrication of the electronic structure 100, one or more of the cell high-k dielectric material 130 and the pillar high-k dielectric material 125 may, optionally, be subjected to one or more treatment acts. The treatment act may include, but is not limited to, annealing acts that densify, crystallize, oxidize, provide interfacial properties, or otherwise modify properties of the high-k dielectric materials 125, 130. By way of example only, the cell high-k dielectric material 130 and the pillar high-k dielectric material 125 may be subjected to an inert annealing act, an ambient annealing act, a radical-based annealing act, etc. The pillar high-k dielectric material 125 may be subjected to the optional treatment act after forming the pillar high-k dielectric material 125 and before forming the cell high-k dielectric material 130. Alternatively, both the pillar high-k dielectric material 125 and the cell high-k dielectric material 130 may be subjected to the optional treatment act, such as after forming each of the pillar high-k dielectric material 125 and the cell high-k dielectric material 130 or after forming both of the pillar high-k dielectric material 125 and the cell high-k dielectric material 130. Alternatively, only the cell high-k dielectric material 130 may be subjected to the optional treatment act(s), such as after forming the cell high-k dielectric material 130. Since the treatment acts may be conducted at various stages in the fabrication process, a larger process window exists for forming the electronic structure 100 containing the high-k dielectric materials 125, 130 according to embodiments of the disclosure. Additionally, since the treatment acts may be conducted from the cell region 165 (when the cell high-k dielectric material 130 is exposed) or from the pillar region 170 (when the pillar high-k dielectric material 125 is exposed), forming the electronic structure 100 containing the high-k dielectric materials 125, 130 according to embodiments of the disclosure may be easily integrated with conventional process flows.

Figure 7A:
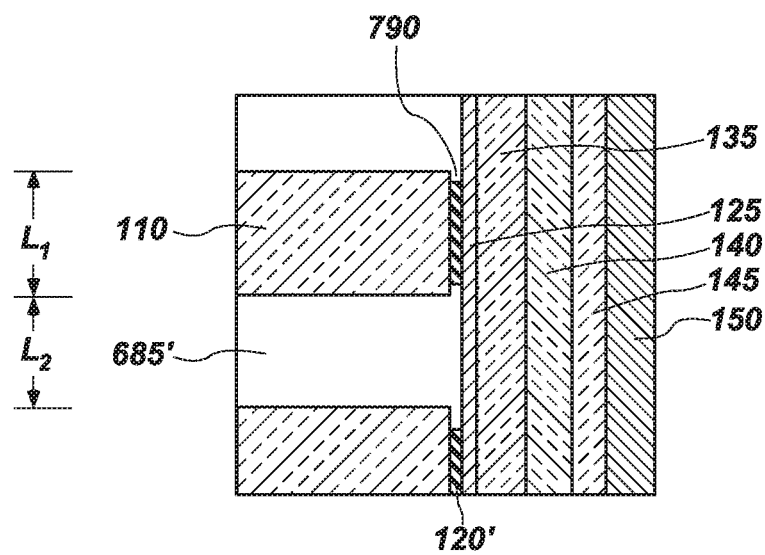
FIGS. 7A and 7B are cross-sectional views that illustrate forming the electronic structures of FIGS. 2A and 2B.

The electronic structure 100' may be formed as shown in FIGS. 6A-6D and FIGS. 7A and 7B. The stacks 105, the etch stop material 120, the pillar high-k dielectric material 125, the charge blocking material 135, the storage node material 140, the tunnel dielectric material 110, and the openings 685 are formed as described above and shown in FIGS. 6A-6D. The etch stop material 120 may be one of the materials previously described, except is not silicon oxide or silicon nitride. The material for the etch stop material 120 may be selectively etchable relative to the dielectric material 110 and the pillar high-k dielectric material 125, such as silicon, a metal, silicon oxycarbide, or silicon carbonitride. As shown in FIG. 7A, a portion of the etch stop material 120 may be removed, forming recesses 790 laterally adjacent to the dielectric material 110. The length of the etch stop material 120' following the formation of the recesses 790 may be less than the initial length of the etch stop material 120. The recesses 790 in the etch stop material 120' may be formed using conventional etch chemistries and etch conditions. The etch chemistry and etch conditions may be selected depending on the material used as the etch stop material 120. Dimensions of the recesses 790 may be selected by appropriately selecting the etch chemistry and etch conditions. The dimensions of the recesses 790 may be between about 1 nm and about 10 nm, such as between about 1 nm and about 4 nm or between about 1 nm and about 3 nm. By increasing the dimensions of the recesses 790, the extent (e.g., degree) of adjoinment between the high-k dielectric materials 125, 130 may be decreased. Portions of the etch stop material 120' remain adjacent to (e.g., laterally adjacent to) the dielectric material 110 and the pillar high-k dielectric material 125. A profile of the recesses 790 in the etch stop material 120' determine the shape of a resulting gate formed from the conductive material 115.

Figure 7B:
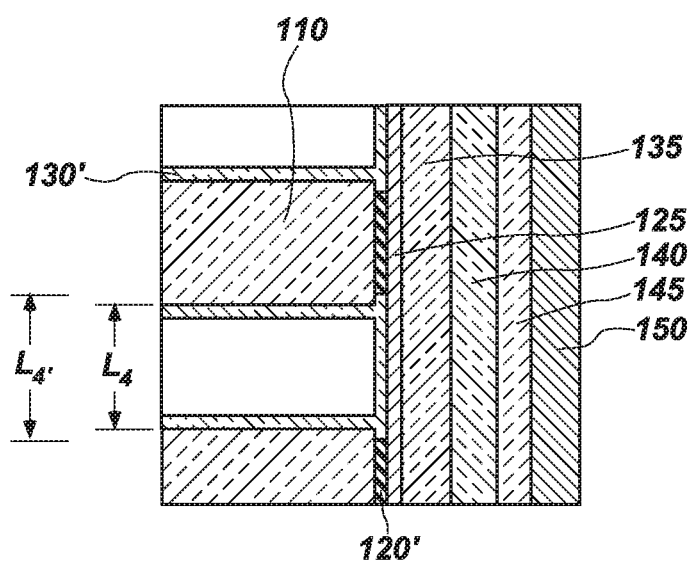

The cell high-k dielectric material 130' may be formed adjacent to (e.g., over) the dielectric material 110 and the pillar high-k dielectric material 125 and in the recesses 790, as shown in FIG. 7B. The cell high-k dielectric material 130' may be conformally formed as described above and shown in FIG. 6F, except that the cell high-k dielectric material 130' is also conformally formed in the recesses 790. The cell high-k dielectric material 130' is, therefore, formed on the exposed horizontal surfaces of the dielectric material 110, the exposed vertical surfaces of the pillar high-k dielectric material 125, and in the recesses 790. The cell high-k dielectric material 130' may, for example, be formed by ALD. The cell high-k dielectric material 130', therefore, directly contacts the dielectric material 110, the pillar high-k dielectric material 125, and the etch stop material 120'. One or more of the cell high-k dielectric material 130' and the pillar high-k dielectric material 125 may, optionally, be subjected to one or more treatment acts as described above.

The conductive material 115 may be formed on the cell high-k dielectric material 130' and in the openings 685' as described above, to form the electronic structure 100' of FIG. 2B. The conductive material 115 may substantially fill the remaining portion of the openings 685' and may be formed by conventional techniques. Therefore, the cell high-k dielectric material 130' and the conductive material 115 substantially fill the openings 685'. After forming the conductive material 115 in the openings 685', the cell high-k dielectric material 130' is in direct contact with the pillar high-k dielectric material 125 along the vertical surfaces of the pillar high-k dielectric material 125 and with the conductive material 115. The substantially rectangular resulting shape of the conductive material 115 is defined by the shape of the recesses 790 and the openings 685'. The conductive material 115 may be formed by conventional techniques and may substantially fill the remaining portion of the openings 685'. A portion of the cell high-k dielectric material 130' proximal to the pillar high-k dielectric material 125 protrudes above and below the conductive material 115. The protruding portions of the cell high-k dielectric material 130' are in direct contact with the dielectric material 110 and the pillar high-k dielectric material 125. Since the cell high-k dielectric material 130' protrudes above and below the conductive material 115, an upper surface of the protruding portions of the cell high-k dielectric material 130' is not coplanar with the upper surface of the cell high-k dielectric material 130' on the upper horizontal surface of the conductive material 115, and a lower surface of the protruding portions of the cell high-k dielectric material 130' is not coplanar with the lower surface of the cell high-k dielectric material 130' on the lower horizontal surface of the conductive material 115.

Figure 8A:
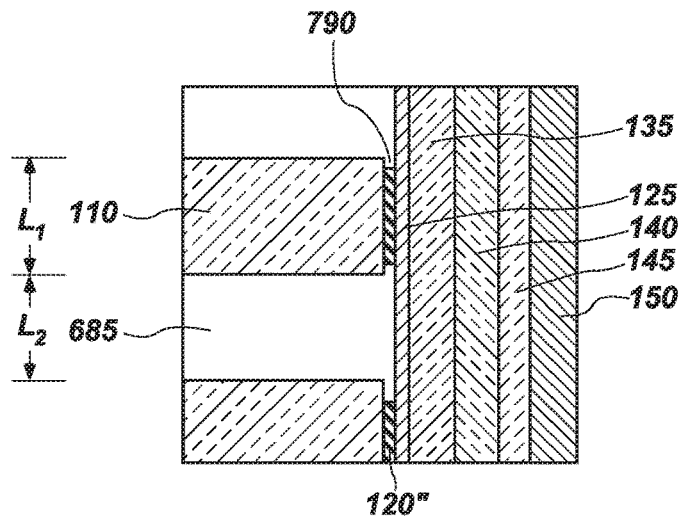
FIGS. 8A-8C are cross-sectional views that illustrate forming the electronic structures of FIGS. 3A and 3B.
Figure 8B:
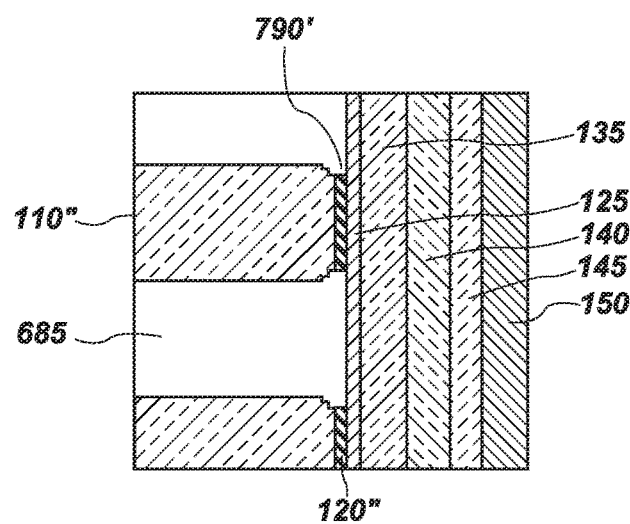
Figure 8C:
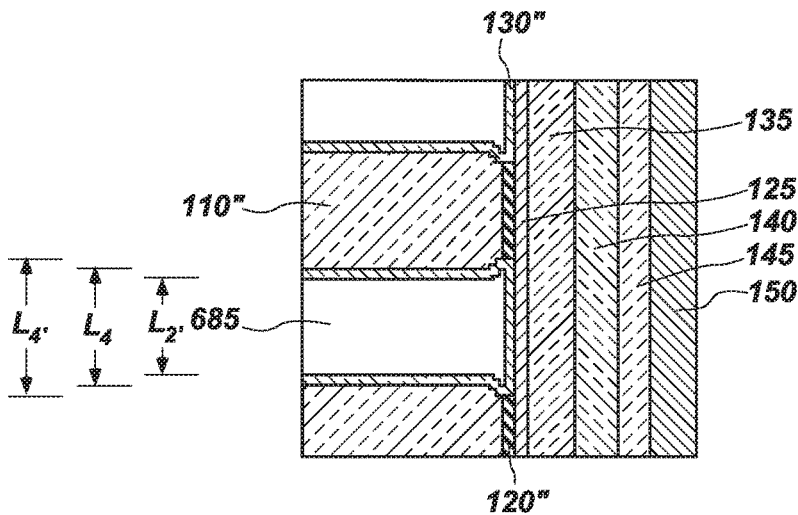

The electronic structure 100" may be formed as shown in FIGS. 6A-6D and FIGS. 8A-8C. The stacks 105, the etch stop material 120, the pillar high-k dielectric material 125, the charge blocking material 135, the storage node material 140, the tunnel dielectric material 110, the pillar openings 680, and the openings 685 are formed as described above and shown in FIGS. 6A-6D. The etch stop material 120 may be one of the materials previously described, except is not silicon oxide or silicon nitride. The material for the etch stop material 120 may be selectively etchable relative to the dielectric material 110 and the pillar high-k dielectric material 125, such as silicon, a metal, silicon oxycarbide, or silicon carbonitride. As shown in FIG. 8A, recesses 790 may be formed by removing a portion of the etch stop material 120. The recesses 790 are as described above in relation to FIG. 7A. After forming the recesses 790, a portion of the dielectric material 110 may be removed by conventional techniques. The portion of the dielectric material 110 laterally adjacent to upper and lower surfaces of the etch stop material 120 may be removed, as shown in FIG. 8B, increasing the size of the recesses 790' and the openings 685' proximal to the etch stop material 120 and the pillar high-k dielectric material 125. The resulting shape of the dielectric material 110" may include rounded surfaces proximal to the etch stop material 120" and the pillar high-k dielectric material 125. The cell high-k dielectric material 130" and the conductive material 115" may be formed in the openings 685 and in the recesses 790, forming the electronic structure 100" as shown in FIGS. 8C and 3B. The shape of the dielectric material 110″ affects the resulting shape of the cell high-k dielectric material 130″ and the conductive material 115″ of the electronic structure 100″.

Alternatively, the electronic structure 100″ may be formed starting with stacks 105 having the dielectric material 110 at a greater thickness than the nitride materials 675. The electronic structure 100″ may be formed as shown in FIGS. 6A-6D and 7A, except that the dielectric material 110 has a greater width than the width of the nitride material 675. In other words, the dielectric materials 110 and the nitride material 675 of the stacks 105 exhibit different widths relative to each other, rather than being substantially equal widths as each other as illustrated in FIGS. 6A-6D and 7A. The stacks 105, the etch stop material 120, the pillar high-k dielectric material 125, the charge blocking material 135, the storage node material 140, the tunnel dielectric material 110, and the pillar openings 680 are formed as described above and shown in FIGS. 6A-6D. The etch stop material 120 may be one of the materials previously described, except the etch stop material 120 is not silicon oxide or silicon nitride. The recesses 790 in the etch stop material 120 may be formed as described above and shown in FIG. 7A. After forming the recesses 790, the portion of the dielectric material 110 proximal to the pillar high-k dielectric materials 125 is removed, increasing the size of the openings 685 proximal to the pillar high-k dielectric material 125. The dielectric materials 110 may be removed by conventional techniques. The resulting shape of the dielectric materials 110″ may include rounded surfaces proximal to the pillar high-k dielectric material 125, similar to that shown in FIG. 8B. The cell high-k dielectric material 130″ and the conductive material 115″ may be formed in the openings 685 and in the recesses 790, producing an electronic structure similar to the electronic structure 100″ shown in FIG. 3B, except that the dielectric materials 110″ and the conductive materials 115″ of the stacks 105 have different widths.

Figure 9A:
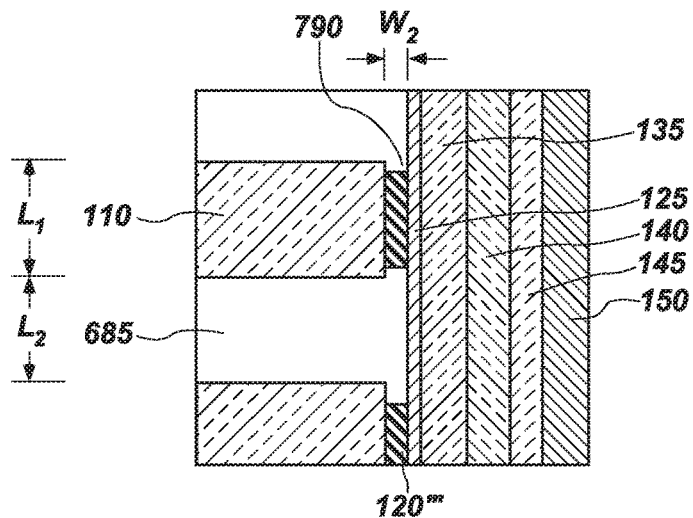
FIGS. 9A-9C are cross-sectional views that illustrate forming the electronic structures of FIGS. 4A and 4B.
Figure 9B:
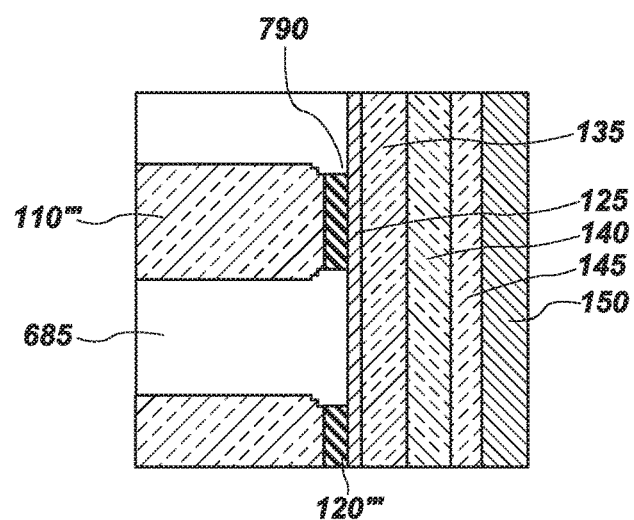
Figure 9C:
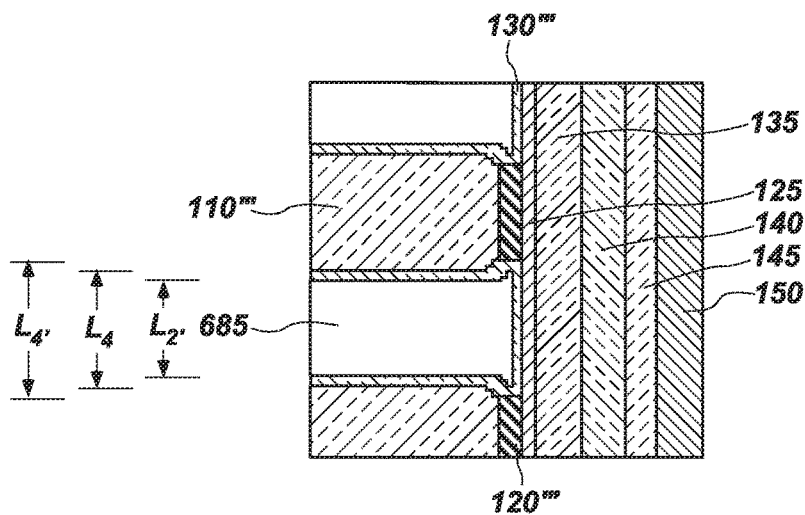

The electronic structure 100‴ may be formed as shown in FIGS. 6A-6D and FIGS. 9A-9C. The stacks 105, the etch stop material 120, the pillar high-k dielectric material 125, the charge blocking material 135, the storage node material 140, the tunnel dielectric material 110, and the pillar openings 680 are formed as described above and shown in FIGS. 6A-6D except that the etch stop material 120 has a greater thickness $W_2$ than in FIGS. 6A-6D. The etch stop material 120 may be one of the materials previously described, except is not silicon oxide or silicon nitride. The material for the etch stop material 120 may be selectively etchable relative to the dielectric material 110 and the pillar high-k dielectric material 125, such as silicon, a metal, silicon oxycarbide, or silicon carbonitride. As shown in FIG. 9A, recesses 790 may be formed by removing a portion of the etch stop material 120. The recesses 790 are as described above in relation to FIG. 7A. A portion of the dielectric material 110 proximal to the pillar high-k dielectric materials 125 may be removed by conventional techniques. The portion of the dielectric material 110 laterally adjacent to the end surfaces of the etch stop material 120′ may be removed, as shown in FIG. 9B, increasing the size of the recesses 790 and the openings 685 proximal to the etch stop material 120‴ and the pillar high-k dielectric material 125. The resulting shape of the dielectric material 110′ may include rounded surfaces proximal to the etch stop material 120‴ and the pillar high-k dielectric material 125. The cell high-k dielectric material 130′ and the conductive material 115‴ may be formed in the openings 685 and in the recesses 790, forming the electronic structure 100‴ as shown in FIGS. 9C and 4B.

Accordingly, a method of forming an electronic device is disclosed. The method comprises forming stacks of alternating dielectric materials and nitride materials. A pillar high-k dielectric material is formed adjacent to the alternating dielectric materials and nitride materials. A charge blocking material, a nitride material, a tunnel dielectric material, and a channel material are formed adjacent to the pillar high-k dielectric material and an insulative material is formed adjacent to the channel material. The nitride materials are removed to form openings between the dielectric materials and a cell high-k dielectric material is formed in the openings. A portion of the cell high-k dielectric material adjoins a portion of the pillar high-k dielectric material. A conductive material is formed in the openings to form stacks of alternating dielectric materials and conductive materials.

Figure 10:
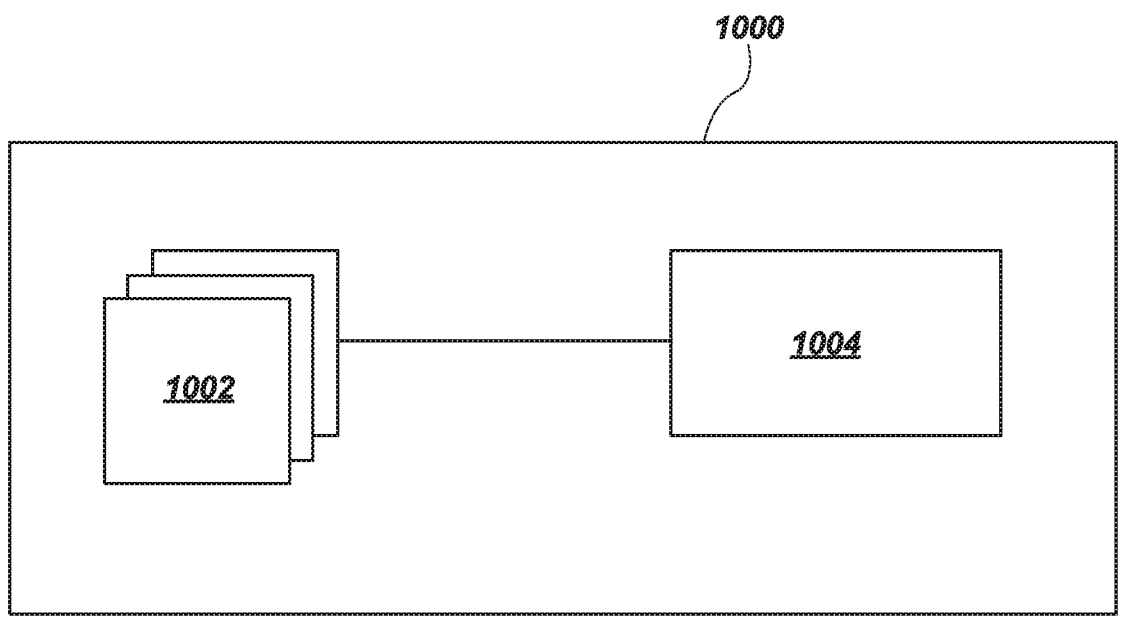
FIG. 10 is a functional block diagram of an electronic device including the electronic structures according to embodiments of the disclosure.

One or more of the electronic structures 100, 100′, 100″, 100‴, 100A, 100A′, 100A″, 100B, 100B′, 100B″ according to embodiments of the disclosure may be present in an electronic device, which may include, but is not limited to, a 3D NAND Flash memory device. The electronic device may be present in a memory array 1000, as shown schematically in FIG. 10. The memory array 1000 includes a memory array of memory cells 1002 and a control logic component 1004. The electronic structures 100, 100′, 100″, 100‴, 100A, 100A′, 100A″, 100B, 100B′, 100B″ according to embodiments of the disclosure include multiple memory cells. The control logic component 1004 may be configured to operatively interact with the memory array of memory cells 1002 so as to read, write, or re-fresh any or all memory cells within the memory array of memory cells 1002. The memory cells of the memory array 1000 are coupled to access lines (e.g., the conductive materials 115, 115″, 115‴), and the access lines are coupled to control gates of the memory cells. A string of memory cells of the memory array 1000 is coupled in series between a source line and a data line (e.g., a bit line). The memory cells are positioned between the access lines and the data lines. The access lines may be in electrical contact with, for example, the conductive materials 115, 115″, 115‴ of the stacks 105, and the data lines may be in electrical contact with an electrode (e.g., a top electrode) of the stacks 105. The data lines may directly overlie a row or column of the memory cells and contact the top electrode thereof. Each of the access lines may extend in a first direction and may connect a row of the memory cells. Each of the data lines may extend in a second direction that is at least substantially perpendicular to the first direction and may connect a column of the memory cells. A voltage applied to the access lines and the data lines may be controlled such that an electric field may be selectively applied at an intersection of at least one access line and at least one bit line, enabling the memory cells to be selectively operated. Additional process acts to form the memory array 1000 including the electronic structures 100, 100′, 100″, 100‴, 100A, 100A′, 100A″, 100B, 100B′, 100B″ are conducted by conventional techniques.

Accordingly, an electronic device is disclosed. The electronic device comprises an array of memory cells and the memory cells comprise stacks of alternating dielectric materials and conductive materials in a cell region of the electronic device and a pillar high-k dielectric material adjacent to the stacks and in a pillar region of the electronic device. An interlayer poly-dielectric structure and a channel material are adjacent to the pillar high-k dielectric material. A cell high-k dielectric material surrounds the conductive materials in the cell region and a portion of the cell high-k dielectric material adjoins a portion of the pillar high-k dielectric material. Access lines and bit lines electrically coupled to the memory cells.

Figure 11:
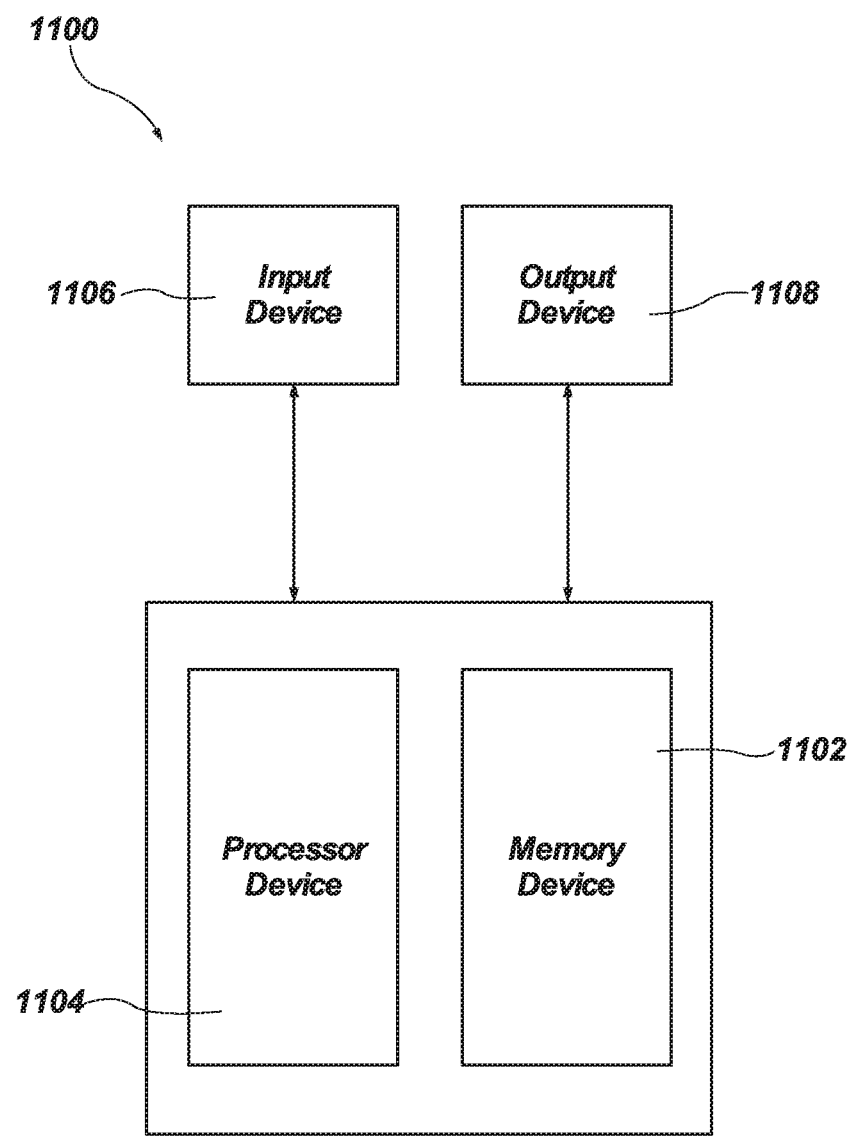
FIG. 11 is a simplified block diagram of a system including the electronic structures according to embodiments of the disclosure.

A system 1100 is also disclosed, as shown in FIG. 11, and includes the one or more electronic structures 100, 100', 100'', 100''', 100A, 100A', 100A'', 100B, 100B', 100B'' according to embodiments of the disclosure. FIG. 11 is a simplified block diagram of the system 1100 implemented according to one or more embodiments described herein. The system 1100 may comprise, for example, a computer or computer hardware component, a server or other networking hardware component, a cellular telephone, a digital camera, a personal digital assistant (PDA), portable media (e.g., music) player, a Wi-Fi or cellular-enabled tablet such as, for example, an iPad® or SURFACE® tablet, an electronic book, a navigation device, etc. The system 1100 includes at least one memory device 1102, which includes the electronic structures 100, 100', 100'', 100''', 100A, 100A', 100A'', 100B, 100B', 100B'' as previously described. The system 1100 may further include at least one processor 1104, such as a microprocessor, to control the processing of system functions and requests in the system 1100. The processor 1104 and other subcomponents of the system 1100 may include the memory cells. The processor 1104 may, optionally, include one or more memory arrays 1000 as previously described.

Various other devices may be coupled to the processor 1104 depending on the functions that the system 1100 performs. For example, an input device 1106 may be coupled to the processor 1104 for inputting information into the electronic system 1100 by a user, such as, for example, a mouse or other pointing device, a button, a switch, a keyboard, a touchpad, a light pen, a digitizer and stylus, a touch screen, a voice recognition system, a microphone, a control panel, or a combination thereof. An output device 1108 for outputting information (e.g., visual or audio output) to a user may also be coupled to the processor 1104. The output device 1108 may include an LCD display, an SED display, a CRT display, a DLP display, a plasma display, an OLED display, an LED display, a three-dimensional projection, an audio display, or a combination thereof. The output device 1108 may also include a printer, an audio output jack, a speaker, etc. In some embodiments, the input device 1106 and the output device 1108 may comprise a single touch-screen device that can be used both to input information to the electronic system 1100 and to output visual information to a user. The one or more input devices 1106 and output devices 1108 may communicate electrically with at least one of the memory device 1102 and the processor device 1104. The at least one memory device 1102 and processor device 1104 may also be used in a system on chip (SoC).

Accordingly, a system is disclosed. The system comprises a processor operably coupled to an input device and an output device, and an electronic device operably coupled to the processor. The electronic device comprises memory cells and one or more of the memory cells comprises stacks of alternating dielectric materials and conductive materials in a cell region of the electronic device. A pillar high-k dielectric material, an interlayer poly-dielectric structure, and a channel material are adjacent to the stacks and in a pillar region of the electronic device. A cell high-k dielectric material is in the cell region and a portion of the cell high-k dielectric material adjoins a portion of the pillar high-k dielectric material.

While certain illustrative embodiments have been described in connection with the figures, those of ordinary skill in the art will recognize and appreciate that embodiments encompassed by the disclosure are not limited to those embodiments explicitly shown and described herein. Rather, many additions, deletions, and modifications to the embodiments described herein may be made without departing from the scope of embodiments encompassed by the disclosure, such as those hereinafter claimed, including legal equivalents. In addition, features from one disclosed embodiment may be combined with features of another disclosed embodiment while still being encompassed within the scope of the disclosure.

What is claimed is:

1. An electronic structure comprising:
   stacks comprising alternating dielectric materials and conductive materials in cell regions of the electronic structure;
   a pillar high-k dielectric material in pillar regions of the electronic structure, the stacks disposed directly and continuously between neighboring ones of the pillar regions and the pillar high-k dielectric material of each of the neighboring ones of the pillar regions adjacent and coextensive with a different opposing sidewall of a corresponding one of the stacks disposed directly and continuously therebetween;
   an etch stop material directly adjacent to and between the dielectric materials of the stacks and the pillar high-k dielectric material;
   a charge blocking material, a nitride material, a tunnel dielectric material, and a channel material adjacent to the pillar high-k dielectric material in the pillar regions of the electronic structure;
   a cell high-k dielectric material surrounding horizontal surfaces and vertical surfaces of the conductive materials in the cell regions of the electronic structure, and the cell high-k dielectric material extending continuously between and adjoining a portion of the pillar high-k dielectric material of each of the neighboring ones of the pillar regions; and
   a first effective gate length of the conductive materials in the cell regions proximal to the pillar high-k dielectric material of the neighboring ones of the pillar regions relatively greater than a second effective gate length of the conductive materials in the cell regions distal to the pillar high-k dielectric materials.

2. The electronic structure of claim 1, wherein the pillar high-k dielectric material and the cell high-k dielectric material separate the stacks from the channel material.

3. The electronic structure of claim 1, wherein a total thickness of the pillar high-k dielectric material and the cell high-k dielectric material is from about 2 nm to about 20 nm.

4. The electronic structure of claim 1, wherein the adjoining pillar high-k dielectric material and the cell high-k dielectric material are proximal to the conductive materials of the stacks.

5. The electronic structure of claim 1, wherein the pillar high-k dielectric material is proximal to the dielectric materials of the stacks and to the conductive materials of the stacks.

6. The electronic structure of claim 5, wherein the cell high-k dielectric material is not proximal to vertical surfaces of the dielectric materials of the stacks.

7. The electronic structure of claim 1, wherein a length of the pillar high-k dielectric material is coextensive with a length of the stacks.

8. The electronic structure of claim 1, wherein the pillar high-k dielectric material and the cell high-k dielectric material comprise materials of different chemical compositions.

9. The electronic structure of claim 1, wherein the pillar high-k dielectric material and the cell high-k dielectric material comprise the same chemical composition.

10. The electronic structure of claim 1, wherein surfaces of the cell high-k dielectric material are substantially planar.

11. The electronic structure of claim 1, wherein a portion of the cell high-k dielectric material adjoining the pillar high-k dielectric material protrudes above an upper horizontal surface of the conductive materials of the stacks and protrudes below a lower horizontal surface of the conductive materials of the stacks.

12. The electronic structure of claim 1, wherein a portion of the cell high-k dielectric material adjoining the pillar high-k dielectric material protrudes above an upper horizontal surface of the cell high-k dielectric material and protrudes below a lower horizontal surface of the cell high-k dielectric material.

13. The electronic structure of claim 1, wherein portions of the conductive materials of the stacks proximal to the pillar regions protrude above an upper horizontal surface of the conductive materials of the stacks and protrude below a lower horizontal surface of the conductive materials of the stacks.

14. The electronic structure of claim 1, wherein the conductive materials of the stacks distal to the pillar high-k dielectric materials comprise a substantially rectangular cross-sectional shape.

15. The electronic structure of claim 1, wherein the conductive materials of the stacks comprise a rounded cross-sectional shape proximal to the pillar regions.

16. The electronic structure of claim 1, wherein the conductive materials of the stacks and the cell high-k dielectric material comprise a rounded cross-sectional shape proximal to the pillar regions.

17. The electronic structure of claim 1, wherein the conductive materials of the stacks exhibit a greater width proximal to the pillar high-k dielectric material than distal to the pillar high-k dielectric material.

18. An electronic device comprising:
   an array of memory cells, the memory cells comprising:
      stacks of alternating dielectric materials and conductive materials in cell regions of the electronic device;
      a pillar high-k dielectric material adjacent to and coextensive with the stacks and in pillar regions of the electronic device, the stacks disposed directly and continuously between the pillar regions, and the dielectric materials in the cell regions comprising rounded surfaces proximal to the pillar high-k dielectric material;
      an etch stop material directly adjacent to and between the dielectric materials of the stacks and the pillar high-k dielectric material;
      an interlayer poly-dielectric structure and a channel material adjacent to the pillar high-k dielectric material;
      effective gate lengths of the conductive materials proximal the pillar regions being greater than gate lengths of the conductive materials distal from the pillar regions; and
      a cell high-k dielectric material surrounding all surfaces of the conductive materials in the cell regions, and a portion of the cell high-k dielectric material adjoining a portion of the pillar high-k dielectric material in each of the pillar regions between which the stacks are directly and continuously disposed; and
   access lines and bit lines electrically coupled to the memory cells.

19. A system, comprising:
   a processor operably coupled to an input device and an output device; and
   an electronic device operably coupled to the processor, the electronic device comprising memory cells, one or more of the memory cells comprising:
      stacks of alternating dielectric materials and conductive materials in cell regions of the electronic device;
      a pillar high-k dielectric material, an interlayer poly-dielectric structure, and a channel material adjacent to opposing sidewalls of the stacks and in pillar regions of the electronic device, the conductive materials in the cell region comprising a rounded cross-sectional shape proximal to the pillar high-k dielectric material;
      an etch stop material directly adjacent to and between the dielectric materials of the stacks and the pillar high-k dielectric material;
      a cell high-k dielectric material surrounding horizontal surfaces and vertical surfaces of the conductive materials in the cell regions and a portion of the cell high-k dielectric material adjoining a portion of the pillar high-k dielectric material adjacent and coextensive with each of the opposing sidewalls of the stacks; and
      effective gate lengths of the conductive materials proximal the pillar regions being greater than gate lengths of the conductive materials distal from the pillar regions.

* * * * *